United States Patent [19]

Rebec et al.

[11] Patent Number: 5,975,531
[45] Date of Patent: *Nov. 2, 1999

[54] HIGH SPEED TELECONFERENCE SYSTEM

[75] Inventors: Mohammed S. Rebec; Mihailo V. Rebec, both of Bristol, Ind.

[73] Assignee: Trans Video Electronics, Inc., Bristol, Ind.

[ * ] Notice: This patent is subject to a terminal disclaimer.

[21] Appl. No.: 09/102,375

[22] Filed: Jun. 23, 1998

Related U.S. Application Data

[63] Continuation of application No. 08/979,546, Nov. 26, 1997, Pat. No. 5,903,621, which is a continuation of application No. 08/561,168, Nov. 21, 1995, Pat. No. 5,740,214, which is a continuation of application No. 08/047,089, Apr. 16, 1993, abandoned.

[51] Int. Cl.$^6$ ............................................. H04B 1/66
[52] U.S. Cl. ......................... 275/240; 375/295; 375/316; 370/260; 370/316; 455/3.2
[58] Field of Search ................................. 375/219, 220, 375/222, 223, 240, 259, 260, 295, 316, 377; 379/158, 202, 206; 348/12, 13–15, 384–386; 455/3.2, 5.1, 11.1, 12.1, 13.1; 370/316, 317, 310, 260

[56] References Cited

U.S. PATENT DOCUMENTS

| | | | |
|---|---|---|---|
| 4,141,039 | 2/1979 | Yamamoto | 375/122 |
| 4,544,950 | 10/1985 | Tu . | |
| 4,807,282 | 2/1989 | Kazan et al. | 379/284 |
| 4,860,022 | 8/1989 | Dobroski | 343/840 |
| 4,937,844 | 6/1990 | Kao | 375/122 |
| 5,057,932 | 10/1991 | Lang | 358/335 |
| 5,262,875 | 11/1993 | Mincer et al. | 358/335 |
| 5,276,866 | 1/1994 | Paolini | 348/12 X |
| 5,315,633 | 5/1994 | Champa . | |
| 5,343,240 | 8/1994 | Yu . | |
| 5,412,660 | 5/1995 | Chen et al. | 370/318 |
| 5,471,657 | 11/1995 | Gharpuray . | |
| 5,619,528 | 4/1997 | Rebec et al. | 375/219 |
| 5,633,891 | 5/1997 | Rebec et al. | 375/219 |

*Primary Examiner*—Amanda T. Le
*Attorney, Agent, or Firm*—Fleshner & Kim

[57] ABSTRACT

A high speed teleconferencing apparatus and method, the apparatus including an encoding unit that encodes and compresses a first digital signal to produce a first compressed encoded signal, a multiplexer unit that receives and splits the first compressed encoded signal into at least two split compressed encoded signals, at least two converter units that receive a respective one of the at least two split first compressed encoded signals and respectively producing at least two first synchronous signals, and at least two output units that receive a respective one of at least two first synchronous signals and output at least two first adapted synchronous signals to a data link. The at least two output units can be, for example, two CCIT units that output at least two high speed first synchronous signals to a high speed data link. The at least two output units can also be two microwave transmitting units that respectively modulate a first microwave signal with the at least two first synchronous signals and combine the modulated signals to output a first combined microwave signal to the data link. The system can transmit information such as an audio/video signal of broadcast quality or file information via satellite to/from any location.

19 Claims, 17 Drawing Sheets

HIGH SPEED TELECONFERENCE SYSTEM

This application is a Continuation of application Ser. No. 08/979,546 filed Nov. 26, 1997, now U.S. Pat. No. 5,903,621 which is a Continuation of application Ser. No. 08/561,168, filed Nov. 21, 1995 and now issued as U.S. Pat. No. 5,740,214, which is a Continuation of application Ser. No. 08/047,089, filed Apr. 16, 1993, and now abandoned.

BACKGROUND OF THE INVENTION

1. Field of the Invention

This invention relates generally to an apparatus and method for transmitting information from one location to another and in particular to a portable satellite communications system capable of digitizing, compressing and transmitting video information from a first location, and receiving, decompressing and viewing the video signal at a second location.

2. Description of Related Art

A news team frequently has to transmit a video clip of a news story at some remote location site back to a home television station. Typically, the news team accomplishes this by either using their own earth station with a satellite dish and uplink electronics or renting such an earth station from a third party. Often, however, the television station cannot afford such an earth station or none is available from a third party and consequently the news team must rely on a nearby government ministry-owned satellite earth station.

FIG. 1A shows a truck 10 with a satellite dish 16 which together serve as a point-of-origin independent earth station 14. In order to be point-of-origin independent, earth station 14 must use the C or Ku-band and, consequently, the diameter of the dish 16 must be at least 10 to 15 meters. Truck 10 contains all uplink electronics required to transmit microwave signals in the C or Ku band. A video signal is modulated onto a microwave signal and then is amplified and transmitted to a satellite 20 typically owned by some government agency. That government agency is not necessarily associated with the country in which the earth station is located. The microwave signal is then downhinked to another large microwave dish 24 at television station 28 where it can be broadcast live to a surrounding area or taped for broadcast at a later time. Alternatively, local television station 28 can retransmit the video clip from dish 24 to another television station 29 having its own dish 30 with a diameter of about 8–12 feet (FIG. 1B). A local television station can then rebroadcast the video clip to its local viewers.

This process has a variety of drawbacks. For example, earth station 14 is very large, heavy and has expensive uplink electronics. Also, earth station 14 can weigh several tons and consequently shipping such a system itself can become very expensive. Truck 10 with uplink electronics and large dish 16 can require 6 to 8 men to assemble and operate. In addition, earth station 14 can cost several hundred thousand dollars to own, or tens of thousands of dollars to rent on a per day basis. The process described with reference to FIG. 1A has further drawbacks. For example, in order to operate earth station 14, the news team must obtain a license from the country in which the earth station 14 is located. Since earth station 14 must be shipped to the local country, it also has to pass through that country's local customs office.

Even after all of the above drawbacks are overcome, the news team cannot send the video clip from earth station 14 to television station 28 until several more steps have been performed. First, earth station 14 must contact the appropriate government agency which operates satellite 20 and prebook a specific time period during which the video clip will be transmitted from earth station 14 to television station 28. In addition, earth station 14 and television station 28 both must know and use the protocol required by the particular agency or government which controls satellite 20. Moreover, since the time of transmission via satellite 20 must be prebooked, the uplink will fail if the news team does not have the taped news clip ready. Also, despite its size and complexity, earth station 14 does not typically contain equipment capable of editing the video clip before it is transmitted to television station 28 via satellite 20.

The above scenario can be described as a "best case" scenario since it was assumed that the television station has its own satellite dish 24 and can rent or own an earth station 14. This situation becomes even more complicated and nearly impossible if, for example, television station 28 has to rely on transmitting the video clip out of the country even using that country's government satellite earth station as shown FIG. 1B. In particular, FIG. 1B shows a government satellite earth station 40 with a large C or Ku dish 44 which uplinks C or Ku microwaves to satellite 20 which in turn downlinks these microwave signals to television station 28.

In this scenario, transmission from earth station 40 must be prebooked with the local government in addition to prebooking a transmission time slot with the government or agency which operates satellite 20. (These two governments are likely not the same.) Moreover, since the local government operates earth station 40, it can censor all such news clips and allow only those news clips or sections of news clips to be transmitted with which the government agrees. Furthermore, many countries will not have such a satellite earth station. Consequently, those television stations which do not have access to earth station 40 or to an earth station similar to earth station 14 in FIG. 1A must hand carry or mail the video clip to television station 28 or to another country which does have such an earth station. Hence, by the time the video clip arrives at television station 28, the news it contains is old.

In addition to the above difficulties associated with uplinking a microwave signal to satellite 20, downlinking from satellite 20 to television station 28 may involve one or more hops as shown in FIG. 1C. In particular, FIG. 1C shows microwave signals uplinked form either earth station 14 or governmental earth station 40 to satellite 20 which in turn must be downlinked (due to the location of satellite 20) to a first earth station 50 located, for example, in Europe. First earth station 50 must in turn uplink to a second satellite 20' which in turn downlinks to television station 28. During this process, the protocol of each link must be complied with. This creates an even greater burden on the news team.

Teleconferencing technology like news gathering and broadcasting technology involves transmitting video signals from one location to another. However, teleconferencing differs from news gathering in that news gathering typically involves transmitting high quality video images from a first location and receiving that information at a second location, whereas teleconferencing involves both transmitting and receiving video images at each of the first and second locations albeit not necessarily video images of broadcast quality.

FIG. 2 shows a first building 200 and a second building 240 interconnected via a high speed digital data network 250 such as (ACUNET) or integrated services digital network (ISDN). These networks are capable of transmitting digital information at rates of 64 kilobits/second (kbps) or in some cases 128 kbps. Network 250 must include a signal routing center 260 (typically owned and operated by a telephone company) and data lines 264 and 268 interconnecting teleconferencing equipment 274 in building 200 to teleconferencing equipment 278 in building 240. Signal routing center 260 can include a variety of satellite, fiber optic and standard hardwired links.

Teleconferencing equipment 274 and 278 must be capable of transmitting and receiving audio/video signals in real time. In order to do this, data lines 264 and 268 must be capable of transmitting more than the standard telephone line audio bandwidth of 9.6 kbps. Consequently, standard telephone lines cannot be used to interconnect teleconferencing equipment 274 to teleconferencing equipment 278.

ACUNET or ISDN interconnection can transmit at high enough bit rates to enable interconnection of teleconferencing equipment. However, high speed digital (HSD) lines or ISDN lines have been installed in only a few cities throughout the United States and only in the main business districts of those cities. Moreover, only selected buildings within those main business districts have been hard wired with high speed data lines 264 and 268. Also, installation of such high speed data lines is a long and expensive process.

SUMMARY OF THE INVENTION

An object of the invention therefore is to provide a portable transmission system capable of transmitting information from one location to another.

Another object of the invention is to provide a portable transmission system which can be set up quickly and easily.

Another object of the invention is to provide a portable transmission system capable of receiving audio/video information from a satellite.

Another object of the invention is to provide a teleconferencing station capable of transmitting and receiving audio/video information.

Another object of the invention is to provide a receiving system which is also capable of transmitting audio/video information.

Another object of the invention is to provide a transmission system which can transmit a broadcast quality audio/video signal via microwave signals without using a local earth station.

Another object of the invention is to provide a transmission system which includes editing equipment for editing a video clip before transmission.

Another object of the invention is to be able to transmit audio/video information from a remote area without having to utilize multiple satellites, on an ad hoc, prebooked and prearranged, event-by-event basis.

One advantage of this system is that information can be transferred independent of a local government's communications protocol and in multi-satellite configurations, information is transmitted transparently and automatically.

Another advantage of the invention is that it utilizes over 95% of the bandwidth available in a satellite link for audio/video information and 5% for overhead information as opposed to the current practice of 60% of the bandwidth for audio/video information and 40% of the bandwidth for overhead.

Another advantage of the invention is that it is point-of-origin independent.

Another advantage of the invention is that it makes it possible to transmit and receive audio/video information from any place in the world to any place in the world except possibly at the extreme polar caps.

Another advantage of the invention is that it provides transmission of audio/video information on an on-demand, dial-up basis.

Another advantage of the invention is that it is portable in the sense that it can be hand carried by one person in a suitcase.

Another advantage of the invention is that it transmits high quality television pictures even with the presence of small to medium motion in the pictures.

Another advantage of the invention is that it can multiply line rates and feed multi-scan monitors and screens thereby dramatically improving picture resolution.

Another advantage of the invention is that it is compatible with high definition (HD) television.

Another advantage of the invention is that it can be set up and made ready to transmit within a few minutes.

Another advantage of the invention is that it can receive data from an HDS line or an ISDN line.

Another advantage of the invention is that it can operate using the power from a single car battery to power the transmission or receiving system.

Another advantage of the invention is that it automatically compensates for color standards differences when transmitting, e.g., from PAL (the European standard) to NTSC (the U.S. standard) and vice versa.

One feature of the invention is that it uses a small, fabric, microwave umbrella dish which transmits the microwave signal on the L-band (1.5 Ghz).

Another feature of the invention is that it has a built-in forward error correction modem which compensates for heavy snow or rainfall blockage during transmission.

Another feature of the invention is that it uses coding and decoding (CODEC) technology which has a very high degree of motion adaptivity and motion compensation, thereby providing a smooth, high quality picture.

Another feature of the invention is that an analog audio/video signal is digitized and compressed before being transmitted.

Another feature of the invention is that it uses field time visually lossless digital data compression of an audio/video signal.

Another feature of the invention is that it includes video editing equipment for editing the audio/video signal before transmission.

Another advantage of the invention is that the transmission system can easily be converted to a receiving system and vice versa.

Another feature of the invention is that it compresses digital video information when operating as a transmission system and decompresses digital video information when operating as a receiving system.

To achieve at least the above and other objects, advantages and features in whole or in parts, there is provided a high speed teleconference station according to the present invention that includes an encoding/compressing unit that encodes and compresses a first digital signal to produce a first compressed encoded signal; a multiplexing/demultiplexing unit coupled to the encoding/compressing unit that receives and splits the first compressed encoded signal into at least two split first compressed encoded signals; at least two converting units, coupled to the multiplexing/demultiplexing units, that receive a respective one of the at least two split first compressed encoded signals and respectively produce at least two first synchronous signals; and at least two output units each coupled to a respective one of the at least two converting units, that receive a respective one of the at least two first synchronous signals, adapt and respectively output at least two adapted signals to a data link.

To further achieve the above objects, advantages and features in a whole or in parts there is provided a high speed teleconference station according to the present invention that includes an encoding/compressing unit that encodes and compresses a first digital signal to produce a first compressed encoded signal; a multiplexing/demultiplexing unit coupled to the encoding/compressing unit that receives and splits the first compressed encoded signal into at least two split first compressed encoded signals; at least two converting units, coupled to the multiplexing/demultiplexing units, that receive a respective one of the at least two split first compressed encoded signals and respectively produce at least two first synchronous signals; at least two microwave transmitter/receiver units, each coupled to a respective one of the at least two converting units, each receiving a respective one of the at least two first synchronous signals, generating a respective first microwave signal, modulating the respective first microwave signal according to the respective one of the at least two first synchronous signals to produce at least two first modulated microwave signals; and a combining/splitting unit, coupled to the at least two microwave transmitter/receiver units, that combines the at least two first modulated microwave signals and outputs a first combined microwave signal.

To further achieve the above and other objects, advantages and features in a whole or in parts there is provided a high speed teleconference station according to the present invention that includes an encoding/compressing unit that encodes and compresses a first digital signal to produce a first compressed encoded signal; a multiplexing/ demultiplexing unit coupled to the encoding/compressing unit that receives and splits the first compressed encoded signal into at least two split first compressed encoded signals; at least two converting units coupled to the multiplexing/demultiplexing unit that receive a respective one of the at least two split first compressed encoded signals and respectively produce at least two first synchronous signals; and at least two CCIT units, each coupled to a respective one of the at least two converting units that receive a respective one of the at least two first synchronous signals and respectively outputs at least two high speed first synchronous signals to a high speed data link.

To further achieve at least the above and other objects, advantages and features in a whole or in parts there is provided a method for transmitting teleconferencing information according to the present invention that includes encoding and compressing a first digital signal to produce a first compressed encoded signal using an encoder/ compressor; splitting the first compressed encoded signal into at least two split first compressed encoded signals using a demultiplexer; converting each of the at least two split first compressed encoded signals into respective at least two first synchronous signals using respective at least two converters; and modifying and transmitting the at least two first synchronous signals.

To achieve at least the above and other objects, advantages and features of the present invention will become more apparent from the following description of embodiments thereof taken in conjunction with the accompanying drawings.

DETAILED DESCRIPTION OF THE PREFERRED EMBODIMENTS

Figure 1A:
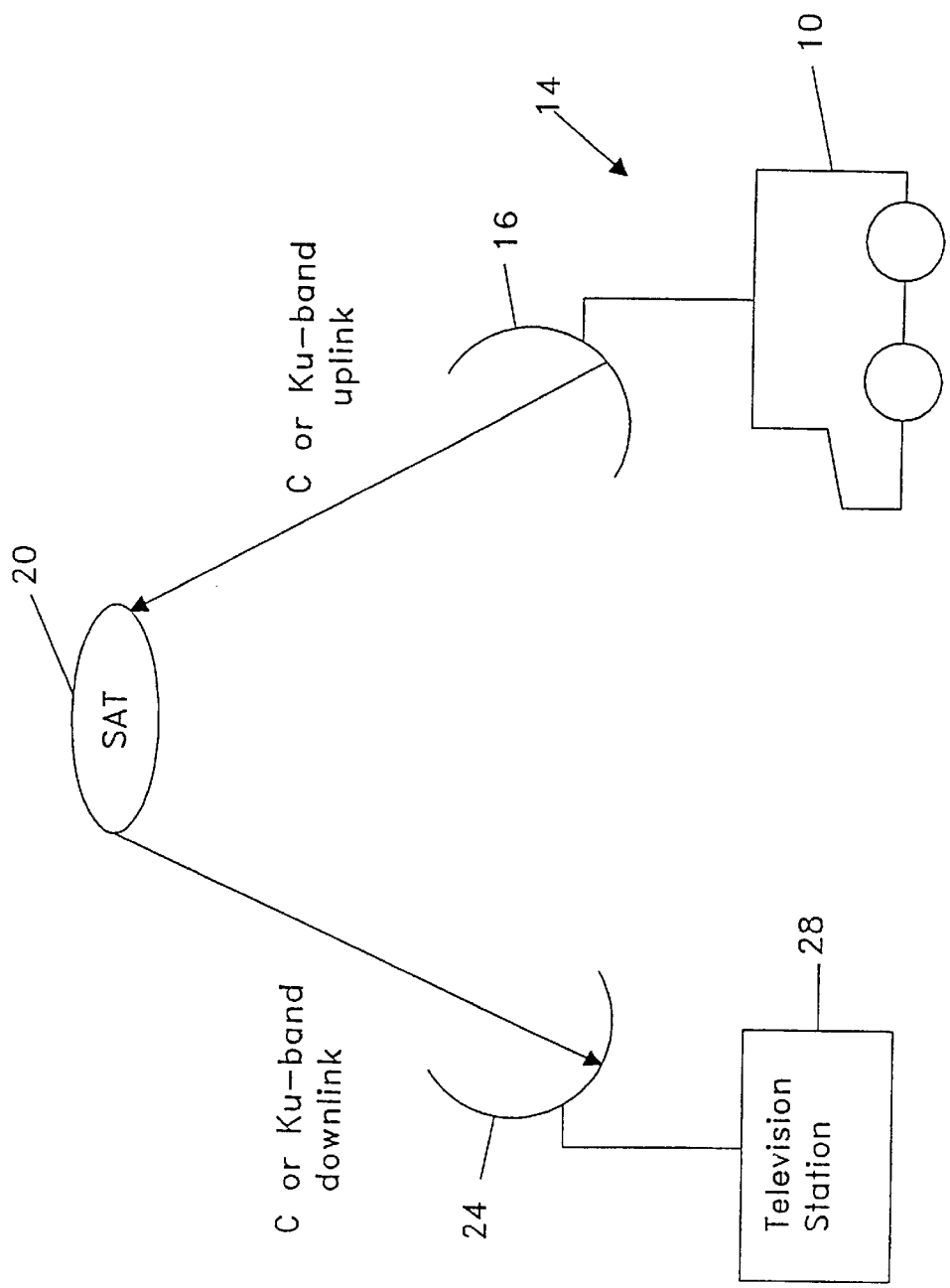
FIGS. 1A and 1B show a truck with a satellite dish which together serve as a point-of-origin independent work station and a government satellite earth station, respectively.
Figure 1B:
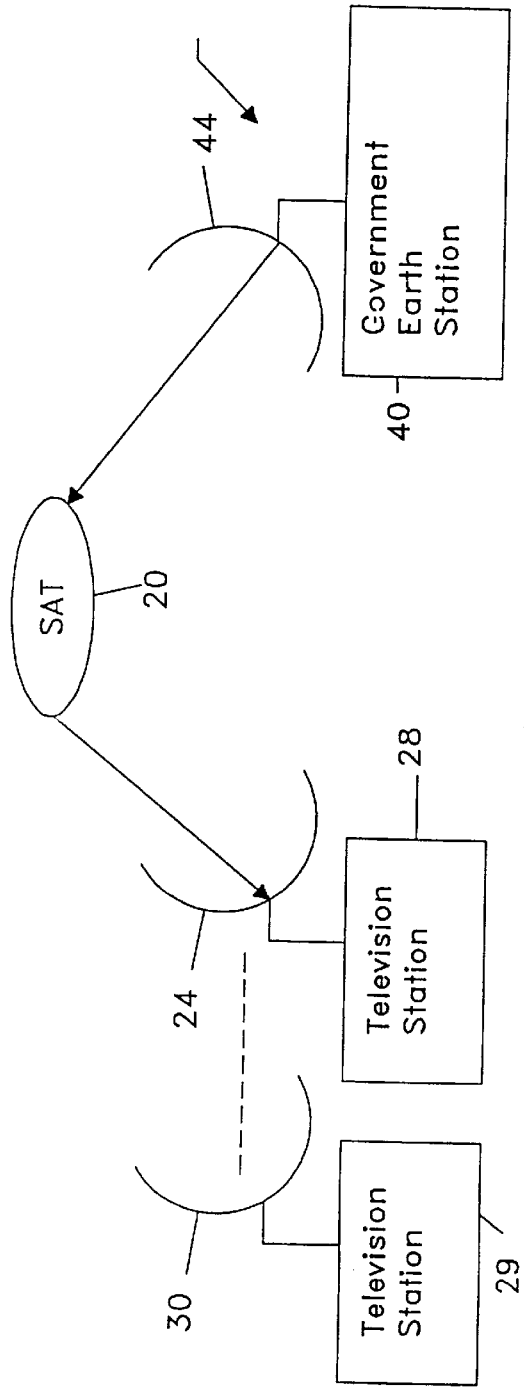
Figure 1C:
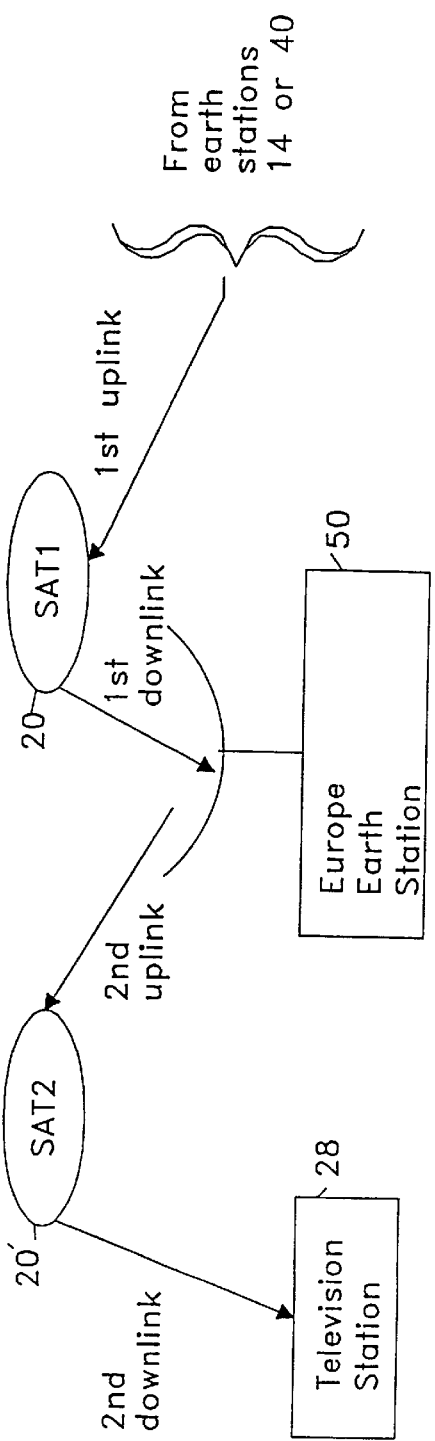
FIG. 1C shows microwave signals uplinked from either the earth station of FIG. 1A or the governmental earth station of FIG. 1B.
Figure 2:
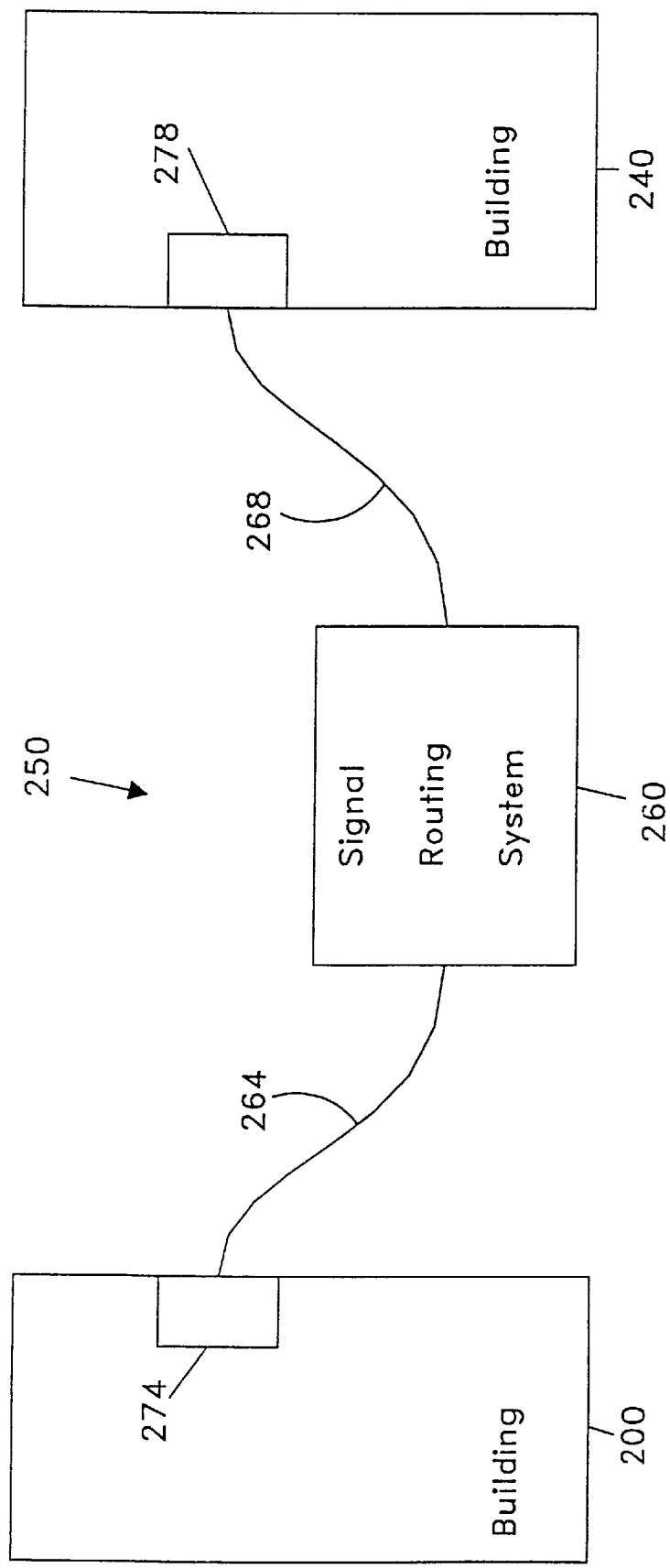
FIG. 2 shows a first building and a second building connected via a high speed digital data network such as ACUNET or ISDN.
Figure 3A:
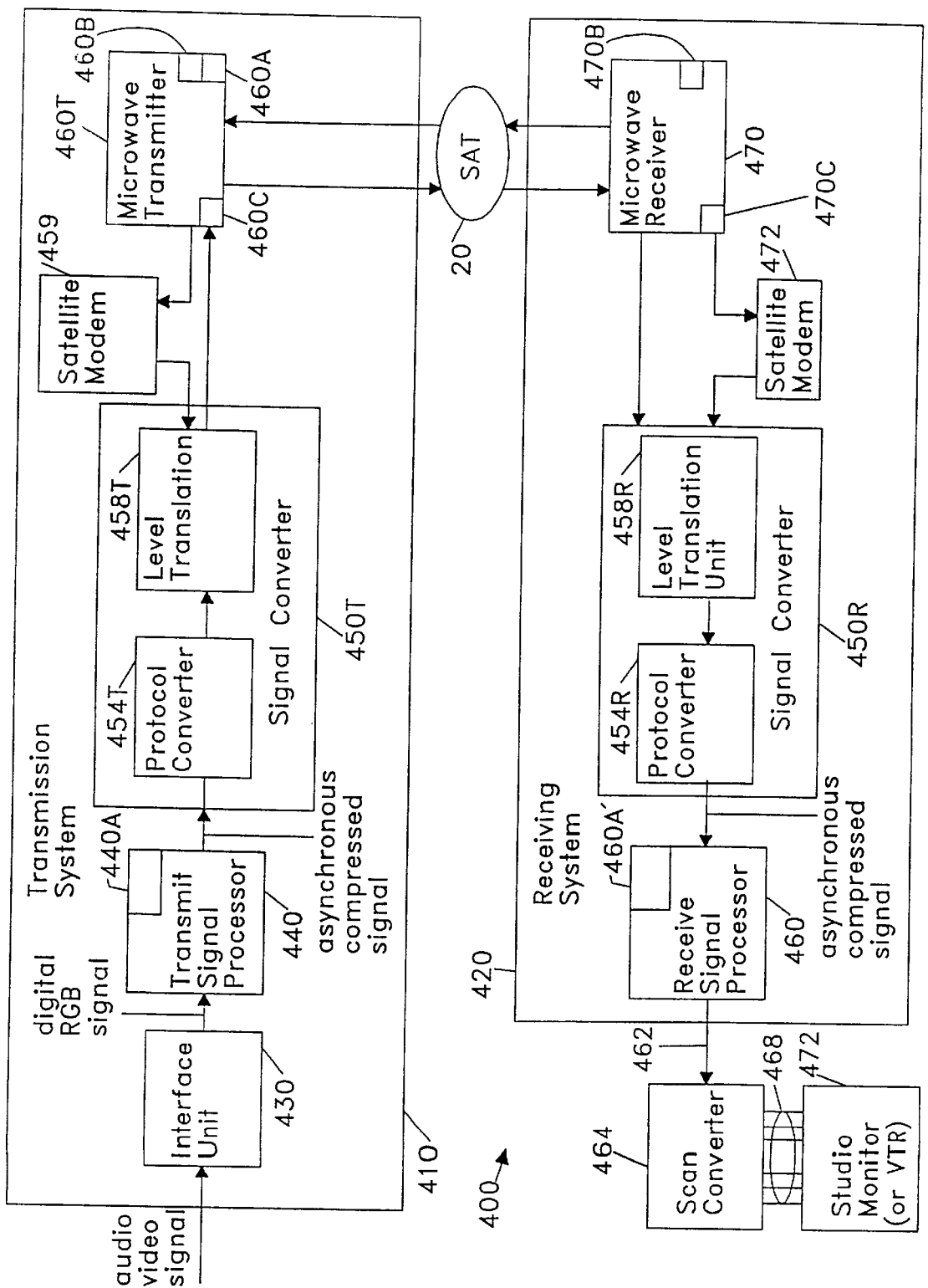
FIGS. 3A and 3B show a transmission and receiving system according to one embodiment of the invention.
Figure 3B:
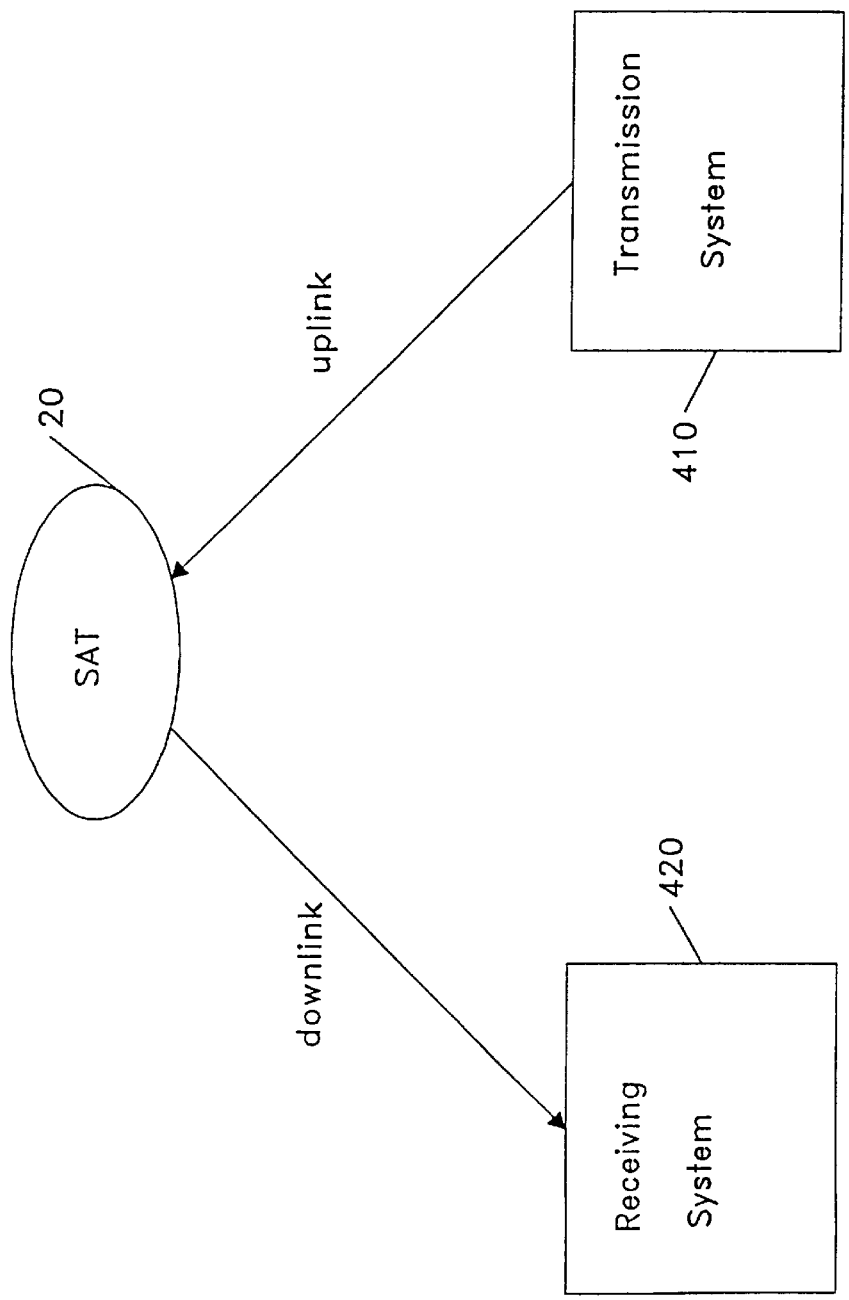

FIGS. 3A and 3B show a transmission and receiving system 400 according to one embodiment of the invention. In particular, FIG. 3A shows a transmission system 410 at a first location which communicates with a receiving system 420 at a second location via satellite 20. Throughout this discussion, embodiments of the invention will be described with respect to transmitting audio/video information, it being understood that the invention will transmit any type of analog or digital information such as digital data files, sensor signals (analog or digital), etc.

Transmission system 410 includes an interface unit 430 which receives an analog audio signal and an analog video signal which will be referred to here as an analog audio/ video signal and transforms the video portion of the analog audio/video signal into a digital red, green, blue (RGB) signal. The audio/video signal can come from a camera or a video tape recorder (VTR) neither of which is shown in the figure. Interface unit 430 demodulates the audio/video signal which is either NTSC, PAL, or SECAM signal and outputs the digital RGB signal. The digital RGB signal output from interface unit 430 is then received by a transmit signal processor 440 which compresses the digital RGB signal into an asynchronous compressed signal and stores that asynchronous compressed signal on a hard disk 440A. Transmit signal processor 440 can then output the asynchronous compressed signal at high speeds using a high speed modem (not shown). The asynchronous compressed signal is in turn received by a signal converter 450T which includes a protocol converter 454T and a level translation unit 458T.

Protocol converter 454T receives the asynchronous compressed signal and converts that signal to a synchronous compressed signal. The synchronous compressed signal is then input to level translation unit 458T which swaps wires and translates the synchronous compressed signal voltage levels into a level translated synchronous compressed signal which is received by a microwave transmitter 460T. Microwave transmitter 460T includes a modulator which modulates the synchronous compressed signal onto a modulated L-band microwave signal. Microwave transmitter 460T then transmits the modulated L-band microwave signal to satellite 20 (which can include one or more earth stations) which receives the L-band microwave signal and transmits that signal to receiving system 420. In particular, microwave transmitter 460T includes an L-band microwave generator 460A, a satellite dish 460B and a microwave modulator 460C. Satellite modem 459 monitors the transmission of the modulated microwave signal from microwave transmitter 460T to receiving system 420. In particular, satellite modem 459 performs handshaking with receiving system 420 at the beginning of transmission and continues to monitor the transmission to determine whether receiving system 420 is being sent the correct signal.

Receiving system 420 includes a microwave receiver 470 which receives the modulated microwave signal and demodulates that signal. Satellite modem 472 performs handshaking with transmission system 410 in a manner similar to satellite modem 459. Microwave receiver 470 includes a microwave demodulator 470C and a microwave dish 470B. A receive signal converter 450R which includes a level translation unit 458R and a protocol converter 454R is similar to signal converter 450T with corresponding level translation unit 458T and protocol converter 454T, respectively. Signal converter 450R operates like signal converter 450T used in the reverse direction. Namely, level translation unit 458R receives a level translated demodulated signal and translates the level of that signal back down to asynchronous (RS-232) signal which can be received by protocol converter 454R and converted to an asynchronous compressed signal. This asynchronous compressed signal is then received by receive signal processor 460 which decompresses it and stores it on a hard disk 460A'. If the decompression of the asynchronous compressed signal received by receive signal processor 460 is the inverse of the compression which the digital RGB signal underwent in transmit signal processor 440, receive signal processor 460 outputs that same digital RGB signal. Consequently, the digital signal at the first location is available at the second location. A scan converter 464 can receive this digital signal and drive a studio monitor 472 via bus 468.

Figure 4A:
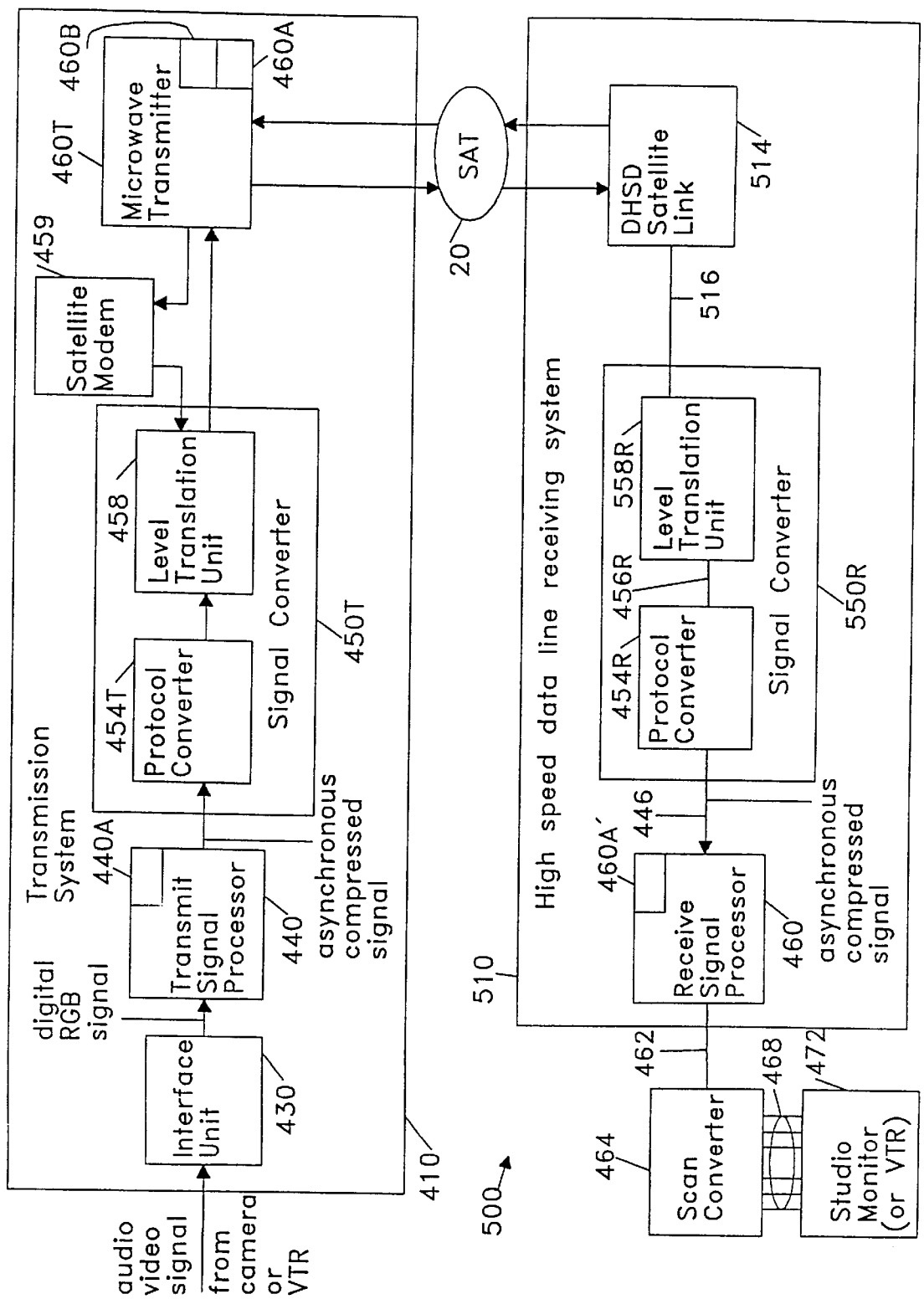
FIGS. 4A and 4B show a transmission and digital receiving system according to another embodiment of the invention.
Figure 4B:
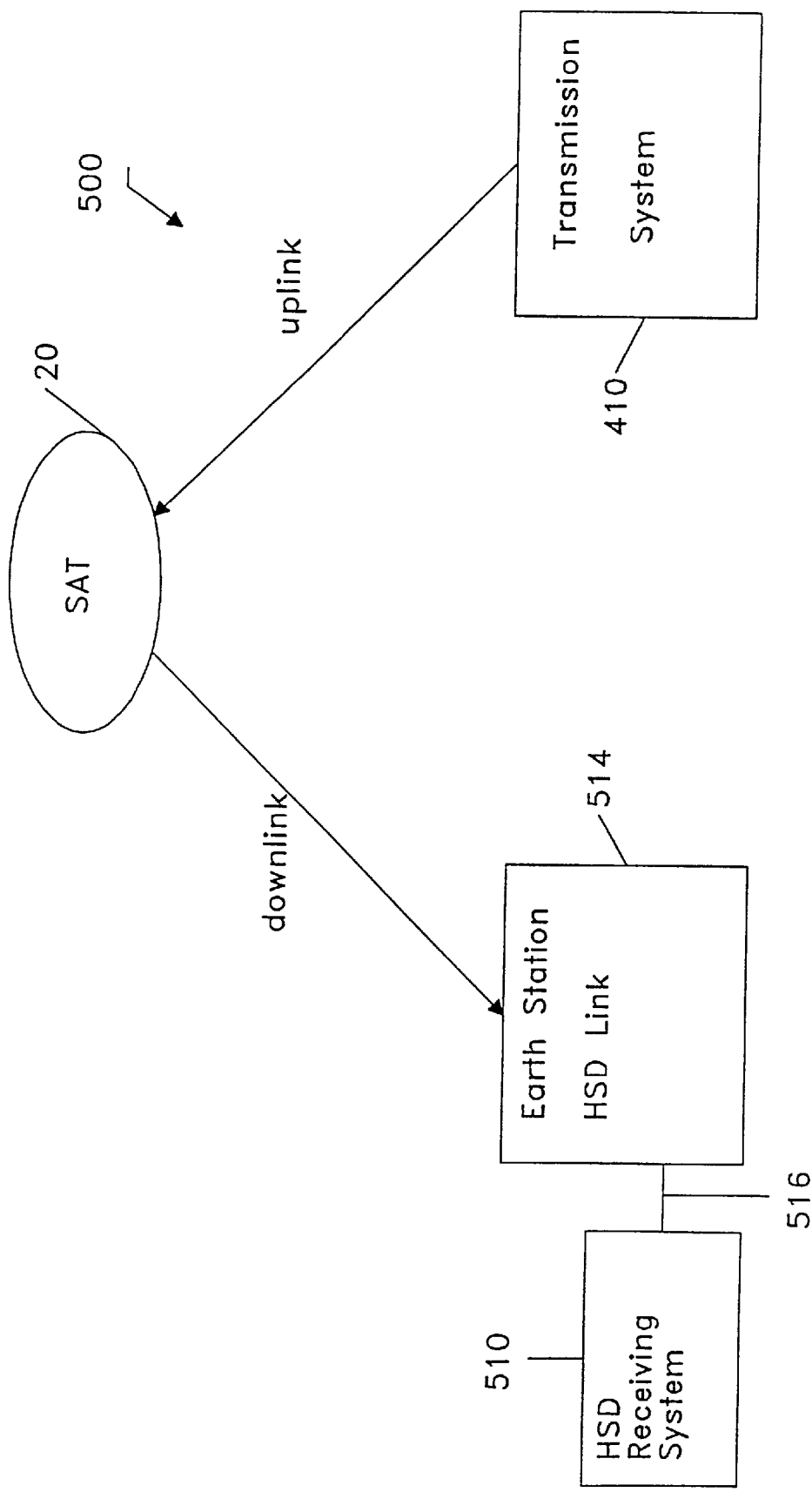

FIGS. 4A and 4B show a transmission system and digital receiving system 500 according to another embodiment of the invention. Those elements in system 500 which are also used in transmission and receiving system 400 will be given the same reference numerals. Transmission system 410 is identical to system 410 in system 400 of FIG. 3A. However, instead of receiving microwave signals from satellite 20 via microwave receiver 470 as in FIG. 3A, a digital receiving system 510 receives digital data from a digital high speed data (DHSD) link 514 available from a phone company. Receiving system 510 includes a signal converter 550R followed by receive signal processor 460. Signal converter 550R includes level translation unit 558R followed by protocol converter 454R.

The microwave signal modulated with compressed digital data is received by a satellite dish (here considered to be part of DHSD link 514) and in turn demodulated to yield a demodulated high speed digital (HSD) signal on DHSD line 516. DHSD link 514 includes satellite, fiber optic and hard wire links. Signal converter 550R receives the digital signal at level translation unit 558R which translates its voltage level for transmission on serial line 456R as a synchronous compressed signal. Protocol converter 454R receives and transforms the synchronous compressed signal into an asynchronous, compressed signal for transmission on bus 446. Receive signal processor 460 in turn receives and decompresses the asynchronous, compressed signal into a digital RGB signal ready to be received and converted by scan converter 464 via line 462 for display via bus 468 on monitor (or VTR) 472.

Figure 5A:
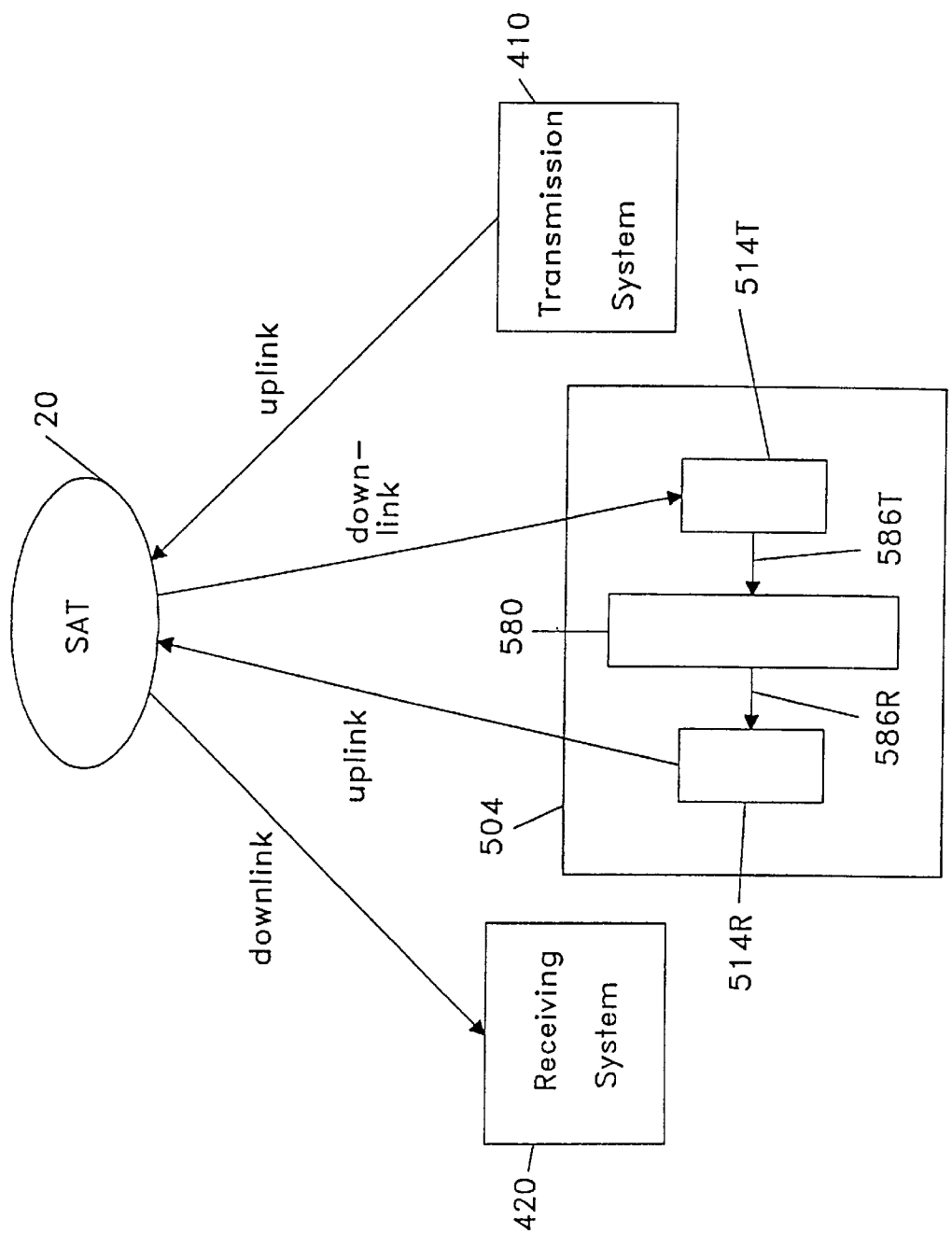
FIGS. 5A and 5B show an alternative transmission system and receiving system which communicate with each other via a patch unit.
Figure 5B:
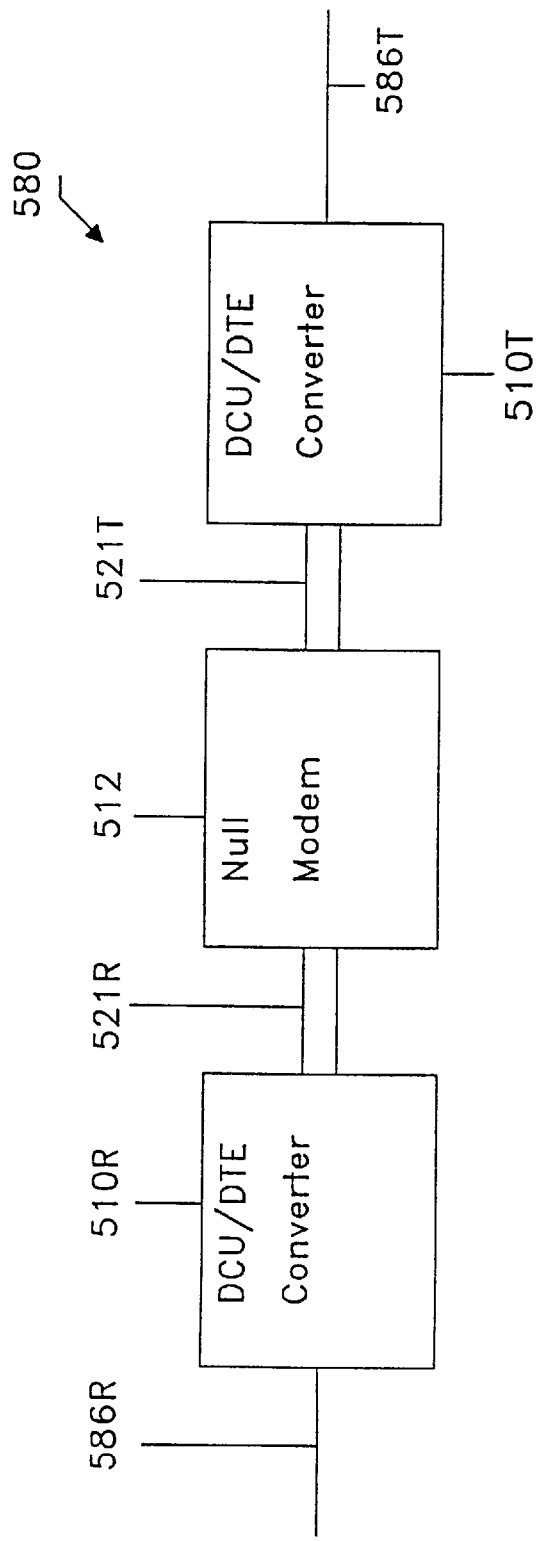

FIG. 5A shows an alternative way in which transmission system 410 and receiving system 420 can communicate with each other by using a patch unit 580. FIG. 5B shows a more detailed view of patch unit 580. Referring to FIG. 5A, transmission system 410 outputs a microwave signal with a digitized and compressed video clip modulated onto the microwave signal. Satellite 20 receives the microwave signal from transmission system 410 and downlinks the microwave signal to a transmitting DHSD link 514T identical to DHSD link 514 of FIG. 4A. Transmitting DHSD link 514T receives the microwave signal via a satellite (not shown), transforms that signal into an HSD signal and transmits that HSD signal to patch unit 580 via line 586T. Patch unit 580 then routes that signal to a receiving line 586R. Receiving DHSD link 514R receives the HSD signal, transforms that signal into a microwave signal and transmits that microwave signal back to satellite 20. Satellite 20 receives that microwave signal and transmits it to receiving system 420 which receives it and eventually outputs a digital RGB signal.

FIG. 5B shows a more detailed view of patch unit 580. Patch unit 580 includes a DCU/DTE conversion unit 510T connected to a null modem 512 followed by a DCU/DTE conversion unit 510R. Line 586T transmits the HSD signal output from DHSD transmission link to DCU/DTE converter 510T and outputs a digital signal on a V.35 pin bus 521T to null modem 512. Null modem 512 is wired so that both DCU/DTE converters 510T and 510R operate as if they are connected to a regular DCU modem. Null modem 512 outputs the digital signal on V.35 pin bus 521R to DCU/DTE converter 510R which receives it and outputs the digital signal via 586R to DHSD link 514R for eventual transmission to satellite 20.

Figure 6A:
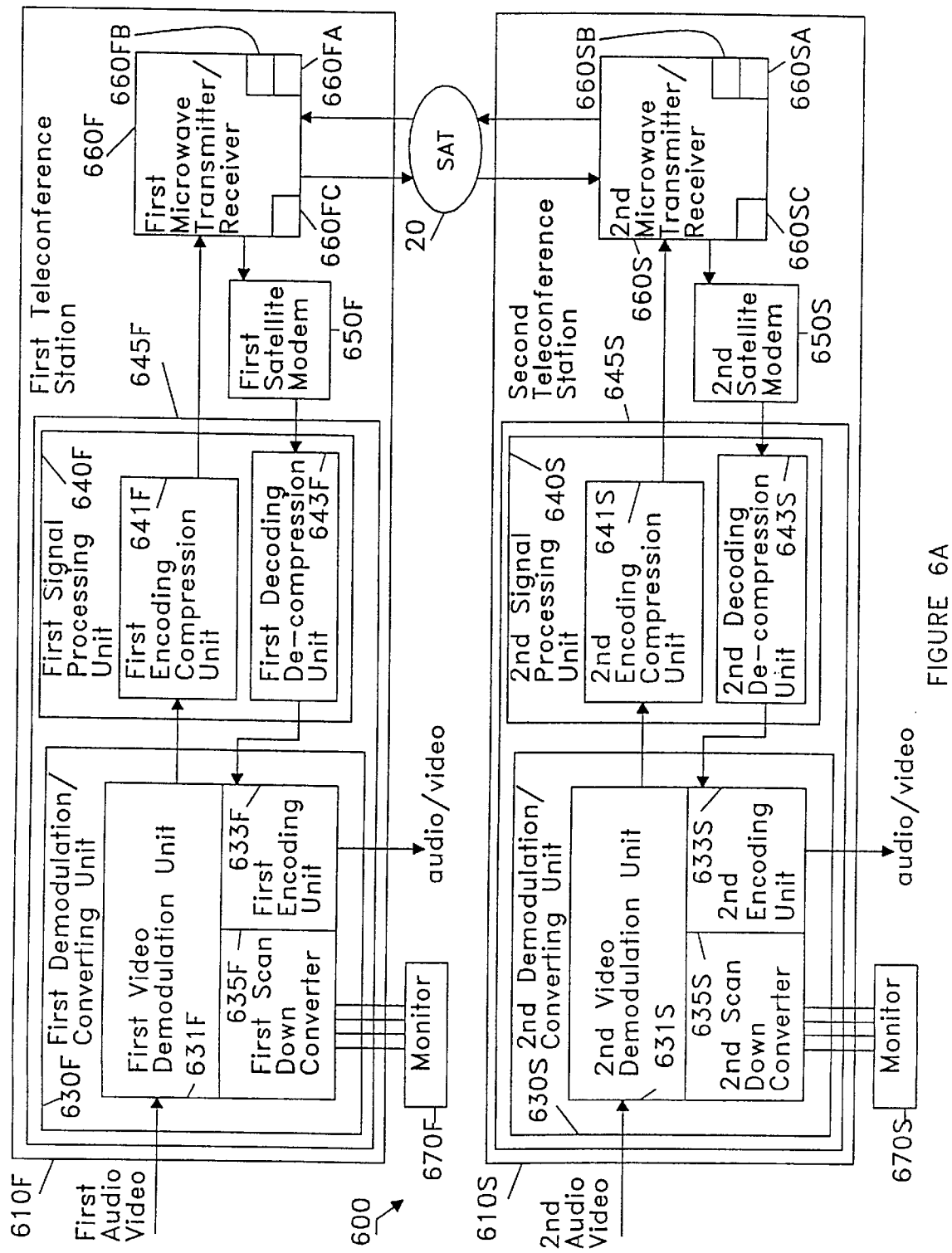
FIGS. 6A and 6B show a teleconference system according to another embodiment of the invention.
Figure 6B:
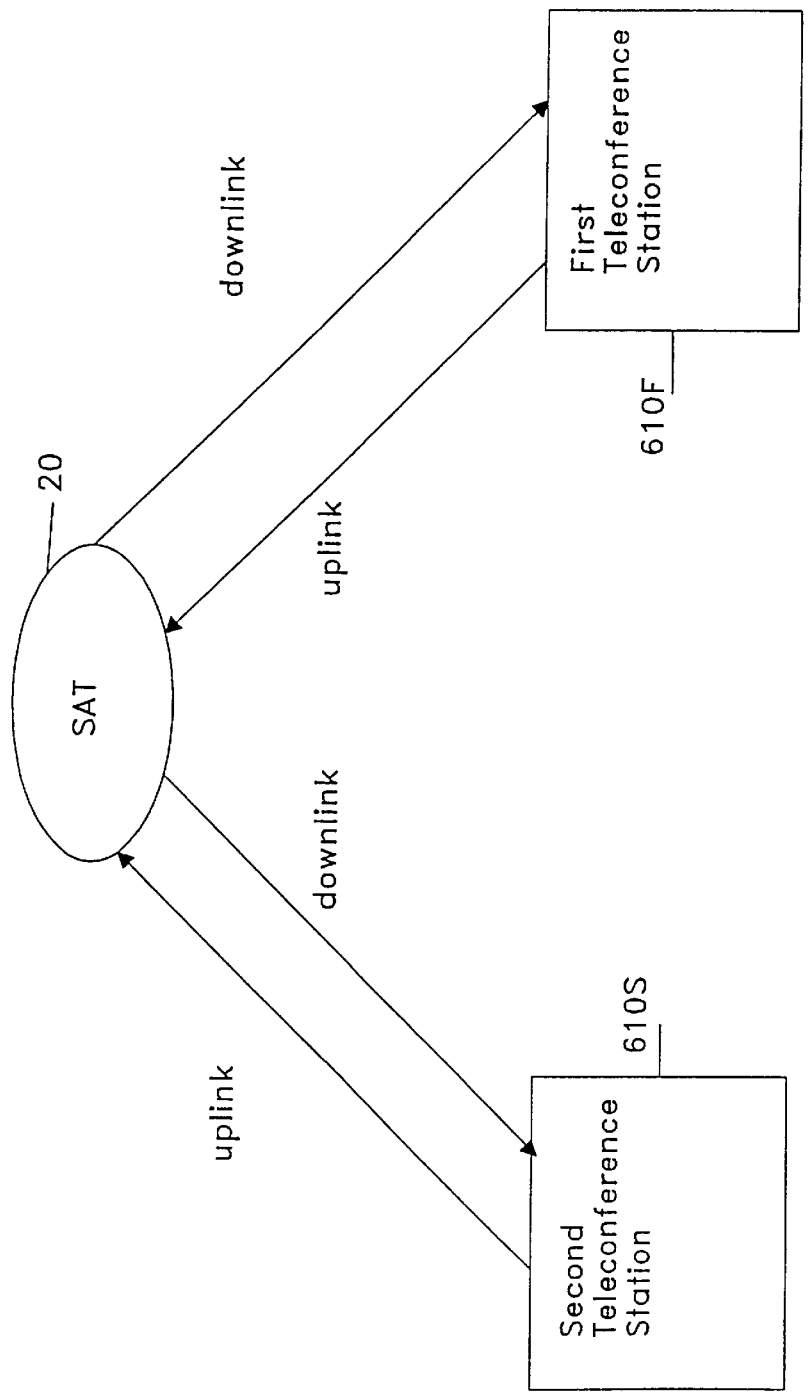

FIGS. 6A and 6B show a teleconference system 600 according to another embodiment of the invention. In particular, teleconference system 600 includes a first teleconference station 610F at a first location and an identical second teleconference station 610S at a second location. First and second teleconference stations 610F and 610S have first and second demodulation/converting units 630F and 630S, first and second signal processing units 640F and 640S, first and second satellite modems 650F and 650S and microwave transmitter/receivers 660F and 660S, respectively. First and second microwave transmitter/receivers 660F and 660S include L-band microwave generators 660FA and 660SA, satellite dishes 660FB and 660SB and microwave modulator 660FC and 660SC, respectively. First and second demodulation/converting units 630F and 630S include first and second video demodulation units 631F and 631S, first and second encoding units 633F and 633S and first and second scan down converters 635F and 635S, respectively. Also, first and second signal processing units 640F and 640S include first and second encoding/compression units 641F and 641S, as well as first and second decoding/decompression units 643F and 643S, respectively.

First demodulation/converting unit 630F together with first signal processing unit 640F make up a first two-way digital video processor 645F. Similarly, second demodulation/converting unit 630S together with second signal processing unit 640S make up a second two-way digital video processor 645S.

The teleconference system operates to send a first audio/video signal from a first camera (not shown) to be displayed by second monitor 670S at second teleconference station 610S while simultaneously sending a second audio/video signal from a second camera (not shown) at second teleconference station 610S to be displayed by first monitor 670F at first teleconference station 610F. Each of these processes is described below.

A first analog audio/video signal is sent from first teleconference station 610F to second teleconference station 610S as follows. The first analog audio/video signal output from a first camera (not shown) at the first location is input to first video demodulation unit 631F. First video demodulation unit 631F then demodulates and digitizes the first analog audio/video signal and outputs a resulting first digital signal. The first digital signal is then input to first encoding/compression unit 641F which can compensate for a high degree of motion, thereby providing smoother, sharper, "non-pixelized" or jittering pictures. First encoding/compression unit 641F in turn encodes and compresses the first digital signal and outputs a first compressed, encoded signal. The first compressed, encoded signal is then received by first microwave transmitter/receiver 660F, which in turn modulates a first microwave signal with the first compressed, encoded signal and transmits a resulting first modulated microwave signal to satellite 20.

Satellite 20 receives the first modulated microwave signal and outputs a downlinking modulated microwave signal having the first compressed, encoded signal modulated thereon. Second microwave transmitter/receiver 660S in second teleconference station 610S receives and demodulates this downlinking modulated signal into the first compressed, encoded signal. Second satellite modem 650S monitors second transmitter/receiver 660S to insure that the signal output from second microwave transmitter/receiver 660S is the same as the first compressed, encoded signal which was earlier output from first signal processing unit 640F. Second transmitter/receiver 660S outputs the first compressed, encoded signal to second decoding/decompression unit 643S in second signal processing unit 640S. Second decoding/decompression unit 643S demodulates and decompresses the first encoded, compressed signal into the first digital signal which is the same as the first digital signal output from first demodulation/converting unit 630F in first teleconference station 610F. This first digital signal is then received by second encoding unit 633S of second demodulation/converting unit 630S to be encoded into NTSC or PAL protocol for viewing on a television set (not shown). Alternatively, the first digital signal is received by second scan down converter 635S of second demodulation/converting unit 630S which outputs a display signal to be viewed on second studio monitor 670S.

A second analog audio/video signal is sent from second teleconference station 610S to first teleconference station 610F as follows. The second analog audio/video signal is output from a second camera (not shown) at the second location and input to second video demodulation unit 631S. Second video demodulation unit 631S then demodulates and digitizes the second analog audio/video signal and outputs a resulting second digital signal. The second digital signal is then input to second encoding/compression unit 641S of second signal processing unit 640S. Second encoding/compression unit 641S in turn encodes and compresses the second digital signal and outputs a second compressed, encoded signal. The second compressed, encoded signal is then received by second microwave transmitter/receiver 660S, which in turn modulates a second microwave signal with the second compressed, encoded signal and transmits a resulting second modulated microwave signal to satellite 20.

Satellite 20 receives the second modulated microwave signal and outputs a downlinking modulated microwave signal having the second compressed, encoded signal modulated thereon. First microwave transmitter/receiver 660F in first teleconference station 610F receives and demodulates this downlinling modulated signal into the second compressed, encoded signal. First satellite modem 650F monitors first transmitter/receiver 660F to insure that the signal output from first microwave transmitter/receiver 660F is the same as the second compressed, encoded signal which was earlier output from second signal processing unit 640S. First transmitter/receiver 660F outputs the second compressed, encoded signal to first decoding/decompression unit 643F in first signal processing unit 640F. First decoding/decompression unit 643F demodulates and decompresses the second encoded, compressed signal into the second digital signal which is the same as the second digital signal output from second demodulation/converting unit 630S in second teleconference station 610S. This second digital signal is then received by first encoding unit 633F of first demodulation/converting unit 630F to be encoded into NTSC or PAL protocol for viewing on a television set (not shown). Alternatively, the second digital signal is received by first scan down converter 635F of first demodulation/converting unit 630F which outputs a display signal to be viewed on first studio monitor 670F.

Figure 7A:
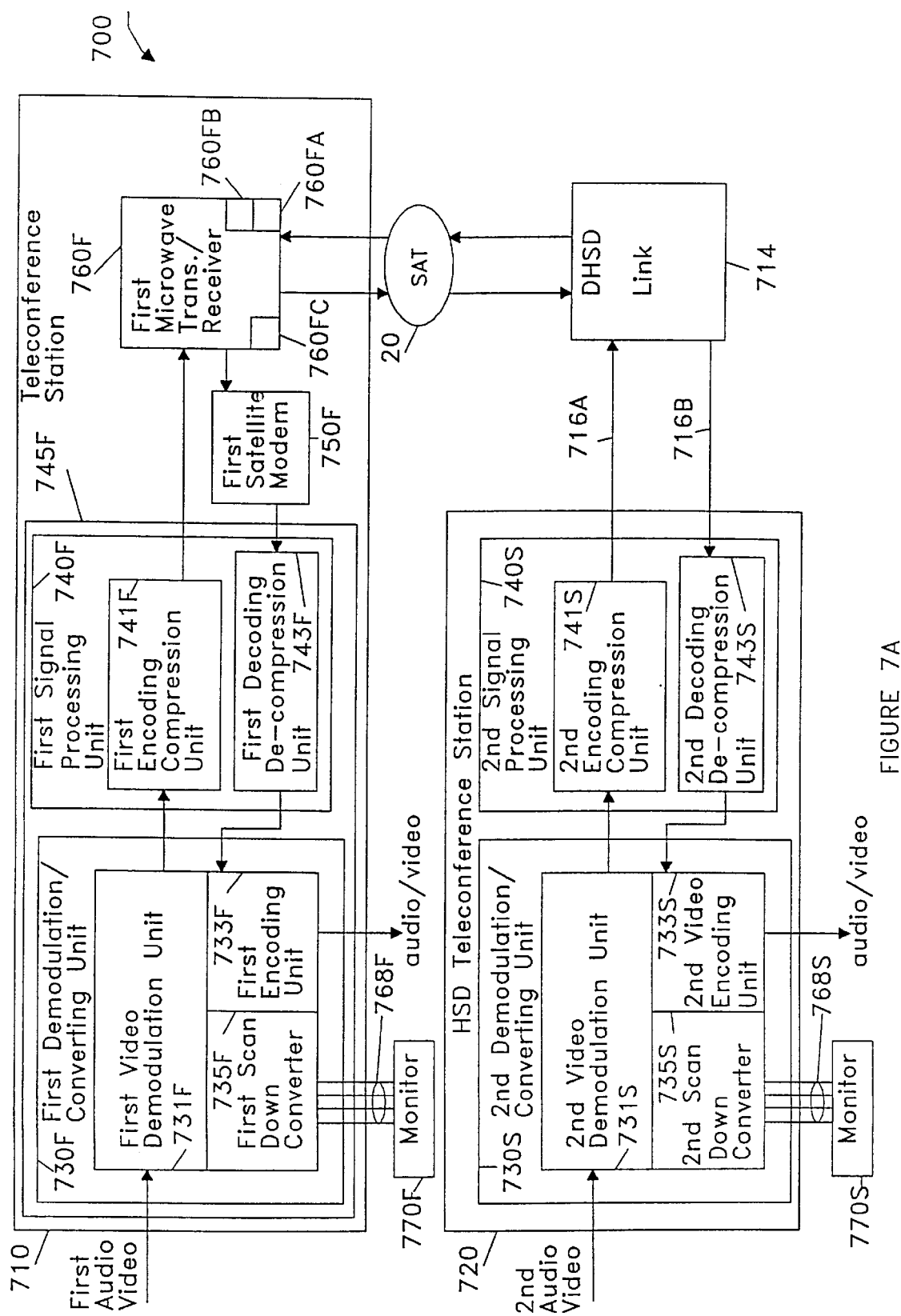
FIGS. 7A and 7B show a teleconference system according to yet another embodiment of the invention.
Figure 7B:
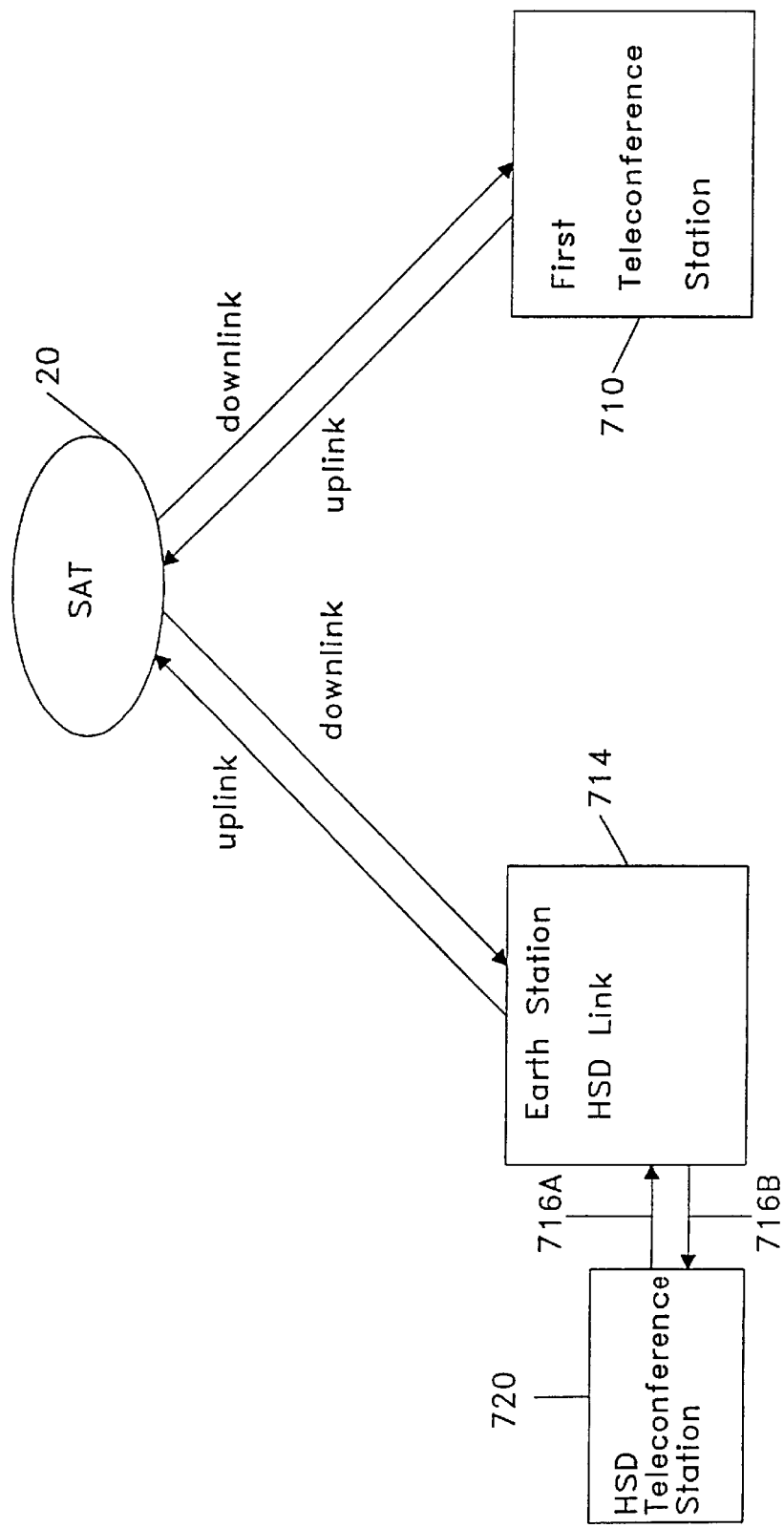

FIGS. 7A and 7B show a teleconference system 700 according to another embodiment of the invention. Teleconference system 700 includes teleconference station 710 at a first location and an HSD teleconference station 720 at a second location. Teleconference station 710 is identical to first or second teleconference station 610F or 610S of teleconference system 600 in FIG. 6A. In particular, teleconference station 710 has a first two-way digital video processor 745F together with first satellite modem 750F and first microwave transmitter/receiver 760F which are identical to first two-way digital video processor 645F, first satellite modem 650F and first microwave transmitter/receiver 660F of FIG. 6A, respectively. Also, first two-way digital video processor 745F includes a first demodulation/converting unit 730F and a first signal processing unit 740F identical to first demodulation/converting unit 630F and first signal processing unit 640F of FIG. 6A, respectively. Similarly, first demodulation/converting unit 730F includes a first video demodulation unit 731F, first encoding unit 733F and first scan down converter 735F which are identical to first video demodulation unit 631F, first encoding unit 633F and first scan down converter 635F, respectively of FIG. 6A. Finally, first signal processing unit 740F includes first encoding/compression unit 741F, as well as first decoding decompression unit 743F which are identical to first encoding/compression unit 641F, as well as first decoding/decompression unit 643F, respectively of FIG. 6A.

HSD teleconference station 720 is connected to a digital high speed data (DHSD) link 714 via two HSD lines 716A and 716B. HSD teleconference station 720 includes a second demodulation/converting unit 730S and a second signal processing unit 740S. Second demodulation/converting unit 730S includes a second video demodulation unit 731S, second encoding unit 733S and second scan down converter 735S. Second signal processing unit 740S includes second encoding/compression unit 741S and second decoding/decompression unit 743S.

Teleconference system 700 operates as follows. Teleconference station 710 is the same as first teleconference station 610F described above. Namely, a first audio/video signal is received, processed and transmitted from teleconference station 710 to satellite 20 the same way that the first audio/video signal was received, processed and transmitted from first teleconference station 610F. Also, a downlinked microwave signal is received, processed and output by teleconference station 710 to monitor 770F (or a television or VTR) the same way that the downlinked microwave signal was received, processed and output by first teleconference station 610F to monitor 670F.

At HSD teleconference station 720, a second analog audio/video signal from a second camera (not shown) is input to second video demodulation unit 731S. Second video demodulation unit 731S then demodulates and digitizes the second analog audio/video signal and outputs a resulting second digital signal. The second digital signal is then input to second encoding/compression unit 741S of second signal processing unit 740S. Second encoding/compression unit 741S in turn compresses and encodes the second digital signal and outputs a second compressed, encoded signal which is sent via HSD line 716A to DHSD link 714 (which is the same as DHSD link 514 discussed with reference to FIG. 4A) to be transmitted to satellite 20 and downlinked to teleconference station 710 as described above.

Satellite 20 downlinks a downlink microwave signal with the first encoded compressed signal modulated thereon to DHSD link 714 which receives and demodulates it and outputs the first compressed, encoded signal as a first demodulated high speed digital (HSD) signal on DHSD line 716B. HSD teleconference station 720 then receives the first HSD signal and eventually outputs an analog RGB signal to second studio monitor 770S or outputs an audio/video signal to a television (not shown) in a manner identical to second two-way digital video processor 645S.

Figure 8:
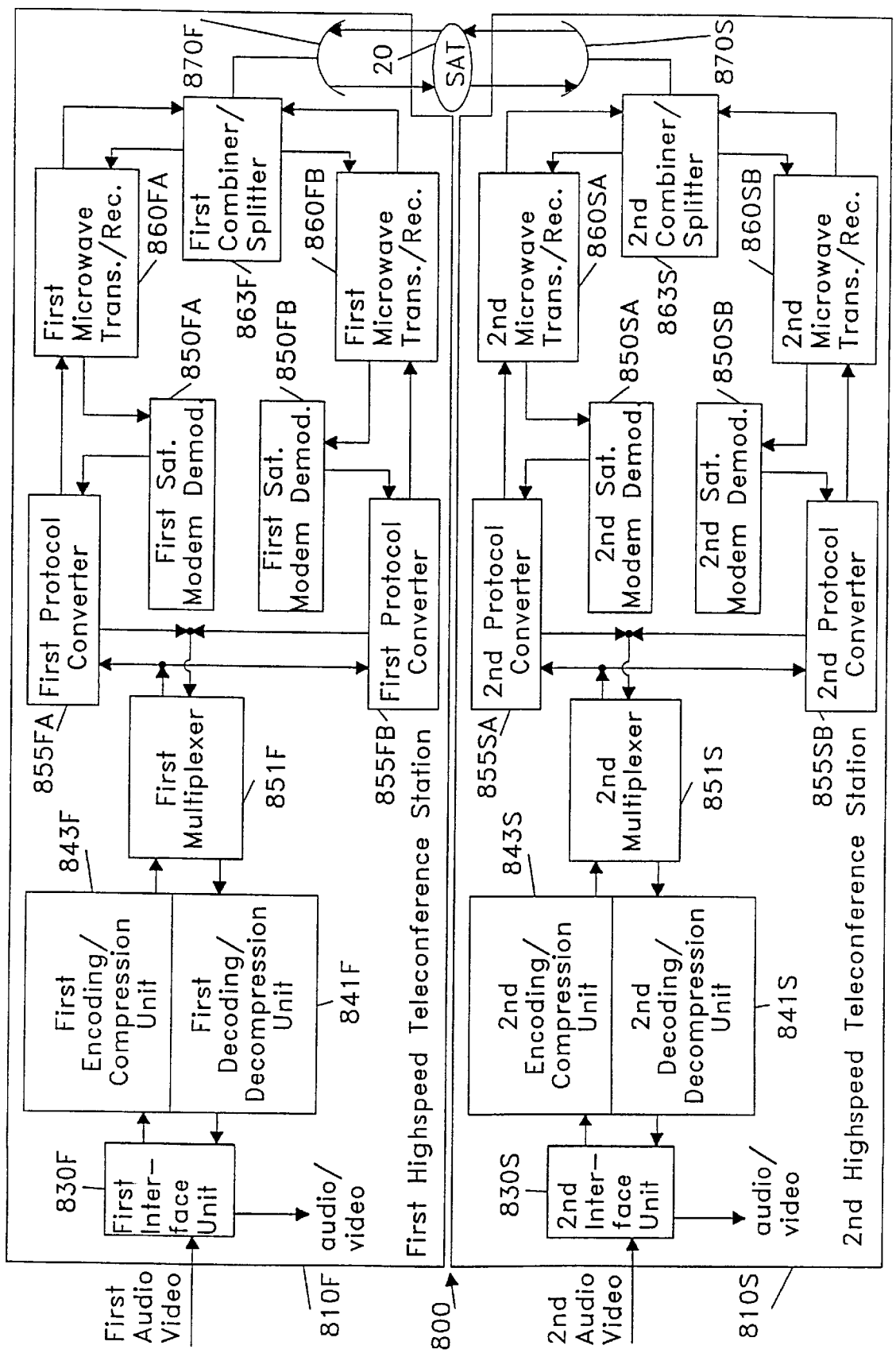
FIG. 8 shows a high speed (128 kbps) teleconference system.

FIG. 8 shows a high speed (128 kbps) teleconference system 800 which includes a first high speed teleconference station 810F and a second high speed teleconference station 810S. First high speed teleconference station 810F has a first interface unit 830F, a first decoding/decompression unit 841F, a first encoding/compressing unit 843F, a first multiplexer 851F, two first protocol converters 855FA and 855FB, two first satellite modem (demodulators) 850FA and 850FB, two first microwave transmitter/receivers 860FA and 860FB, a first microwave combiner/splitter 863F and a first microwave dish 870F.

Second high speed teleconference station 810S has a second interface unit 830S, a second decoding/decompressing unit 841S, a second encoding/compressing unit 843S, a second multiplexer 851S, two second protocol converters 855SA and 855SB, two second satellite modem demodulators 850SA and 850SB, two second microwave transmitter/receivers 860SA and 860SB, a second microwave combiner/splitter 863S and a second microwave dish 870S.

Teleconference system 800 operates as follows. First high speed teleconference station 810F operates as both a transmitting and receiving station. As a transmitting station, first high speed teleconference station 810F receives a first audio/video signal from a camera (not shown) at a first interface unit 830F which digitizes that signal to yield a first digital signal. First signal encoding/compression unit 843F receives the first digital signal and encodes and compresses it to yield a first compressed encoded signal which is asynchronous. First multiplexer 851F (used in reverse and hence serving as a demultiplexer) receives the first compressed encoded signal and splits it into first compressed encoded signals A and B which in turn are received by first protocol converters 855FA and 855FB, respectively. First protocol converters 855FA and 855FB output first synchronous signals A and B to first microwave transmitter/receivers 860FA and 860FB, respectively. First microwave transmitter/receivers 860FA and 860FB output modulated microwave signals A and B which are combined by first combiner/splitter 863F and then output to first microwave dish 870F as first modulated microwave signal A/B. First satellite modem demodulators 850FA and 850FB insure that the signals output from first microwave transmitter/receiver 860FA and 860FB are the same as the signals received by second microwave transmitter/receivers 860SA and 860SB, respectively. Second high speed teleconference station 810S operates in an analogous manner when transmitting a second modulated microwave signal A/B to be received by first high speed teleconference station 810F.

As a receiving station, first satellite dish 870F of first high speed teleconference station 810F receives a second modulated microwave signal A/B which is split (since they are traveling right to left in FIG. 8) by first combiner/splitter 863F. First microwave transmitter/receivers 860FA and 860FB receive second modulated microwave signals A and B and demodulate these second modulated microwave signals A and B to yield resulting second synchronous signals A and B, respectively. First protocol converters 855FA and 855FB in turn output second compressed encoded signals A and B which are combined by first multiplexer 851F to yield a second compressed encoded signal. First decoding/decompression unit 841F decompresses and decodes the second compressed encoded signal and outputs a second audio/video signal which can be viewed on a television monitor (not shown). Second high speed teleconference station 810S operates in an analogous manner when receiving the first modulated microwave signal A/B from first high speed teleconference station 810F.

Figure 9:
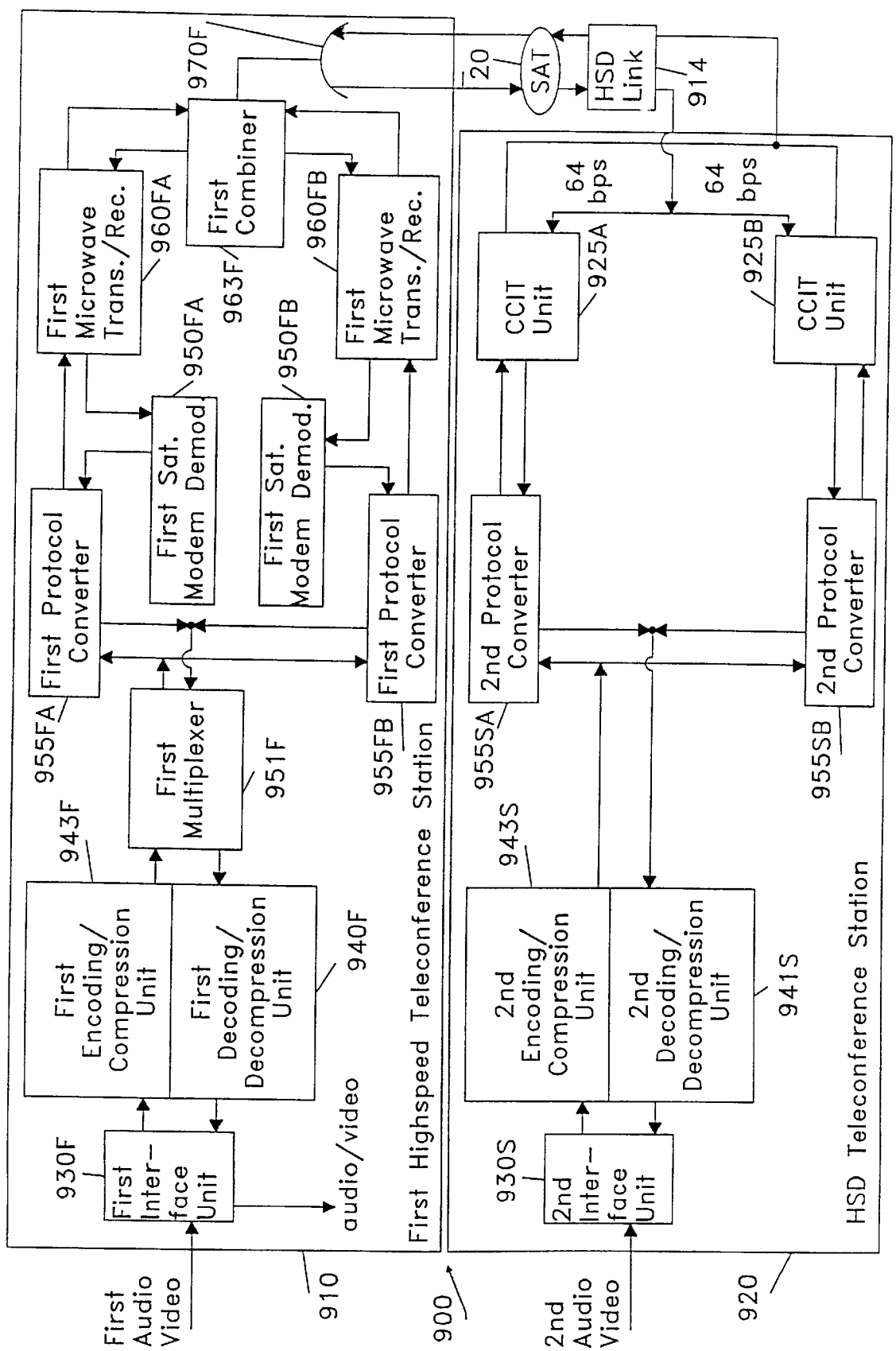
FIG. 9 shows a high speed teleconference system with a first high speed teleconference station as shown in FIG. 8 but with a second high speed teleconference station according to another embodiment of the invention.

FIG. 9 shows a high speed teleconference system 900 with a high speed teleconference station 910 which is analogous to first high speed teleconference station 810F as in FIG. 8 but with a second high speed teleconference station 920 according to another embodiment of the invention. Those elements in FIG. 9 common to FIG. 8 have been given similar reference numbers. For example, high speed teleconference station 910 is the same as first high speed teleconference station 810F in FIG. 8. HSD teleconference station 920 has a second interface unit 930S, a second signal decoding/decompression unit 941S, a second signal encoding/compression unit 943S, two second protocol converters 955SA and 955SB and CCIT 261 units 925A and 925B. As can be seen however, HSD teleconference station 920 does not have second satellite modem demodulators 850SA and 850SB, second microwave transmitter/receivers 860SA and 860SB, a second microwave combiner/splitter 863S or a second microwave dish 870S as shown in second high speed teleconference station 810S of FIG. 8. Instead, HSD teleconference station 920 is coupled to an HSD link 914 similar to HSD links 514 and 714 in FIGS. 4A and 7A, respectively. A line doubler and enhancer can be used to enhance a resulting "soft" picture signal output from second interface unit 930S. This signal can be passed on to a multi-scan (high density television capable) monitor (not shown).

HSD teleconference station 920 operates in the same manner as second high speed teleconference station 810S in transmitting second synchronous signals A and B from second protocol converters 855SA and 855SB and in receiving first synchronous signal A and B from first high speed teleconference station 810F. Here, however, CCIT units 925A and 925B each receives a 64 bps HSD signal from HSD link 914. CCIT units 925A and 925B in turn output the first synchronous signals A and B to two second protocol converters 955SA and 955SB, respectively.

Hardware Implementation

Various embodiments of the invention have been repeatedly tested at COMSAT headquarters at 810 L'Enfant Plaza, Washington, D.C., using the following equipment.

A DigitalFilm break out box made by SuperMac can be used to break down composite video to component video i.e., RGB signals, and consequently can serve as video demodulation units 631F, 631S, 731F and 731S. An Emotia converter can be used to down convert from high frequency computer display domain to analog studio RGB domain and consequently can serve as scan down converters 464, 635F, 635S, 735F and 735S. An NTL encoder takes an RGB computer domain signal and converts to lowest common denominator monitoring and/or recording, i.e., composite video, and consequently can serve as encoding units 633F, 633S, 733F and 733S. Motion J-PEG or AM-PEG compression chips by C-Cubed used with a SuperMac and Macintosh hardware/software package and a 2 Gigabyte dual array hard disk drive provides visually lossless high compression ratios for unmanaged full motion video and consequently can serve as transmit signal processor 440 and receive signal processor 460.

As data enters from the computer domain to the rf communication architecture in the real world, the status of the data must be changed from asynchronous data to synchronous data and the electrical properties of connector pins associated with the transport of the signal must be changed accordingly. Both AM-PEG and J-PEG compression require level translation. However, J-PEG also requires state conversion of data between asynchronous and synchronous conversion, whereas AM-PEG data although asynchronous, is easily modified to become synchronous.

Black Box Model ASI-IV Protocol Converter changes asynchronous data terminal equipment (DTE) to communicate over a synchronous communication line. This converter allows asynchronous devices like terminals, PCs, and midrange computers to communicate using synchronous modems or multiplexers and consequently can serve as protocol converter 454T, 454R. RS-232 to V.35 Interface Converter by Black Box provides bi-directional conversion of all commonly used V.35 (synchronous world) and RS-232 (asynchronous world) equipment. The unit is designed for use as one port configured as DTE and the other port as DCE and consequently can serve as interface units 430, 830F, 830S, 930F and 930S. Also, Black Box ASI-IV Protocol Converter together with RS-232 to V.35 Interface Converter can serve as signal converters 450T, 855FA, 855FB, 855SA, 855SB, 955FA, 955FB, 955SA and 955SB.

TCS-9700 by Mobile Telesystems, Inc. in its full duplex high speed data configuration can serve as microwave transmitter 460T, microwave receiver 470, microwave transmitter/receivers 660F, 660S, 760S, 860FA, 860FB, 860SA, 860SB. The TCS-9700 includes a transmit modem for modulating a microwave signal to provide an uplink data stream.

COMSAT owns and operates earth stations for international L-Band based satellite communications and Inmarsat owns and operates a string of satellites circling the earth which provides on demand high speed data channels for registered users. These channels are charged to a user on a time basis much like telephone lines for telephones.

COMSAT and Inmarsat provide a duplex high speed data microwave channel which requires a demodulator to effectuate a handshake and quality control (feedback). A Comstream Model 701 satellite modem completes the duplex architecture by acting as a demodulator and consequently can serve as satellite modems 459, 472, 650F, 650S, 750F, 850FA, 850FB, 850SA, 850SB, 950FA and 950FB.

A Compression Labs Inc. (CLI) device model Eclipse compresses and decompresses low and medium motion managed video with motion interpolation buffering to give a naturalness to motion and speech indistinguishable from real life and consequently can serve as CCIT units 925A, 925B. This results in a "soft" picture which can be "sharpened" or enhanced by line doubling. National Transcommunications Labs PAL/NTSC to HDTV Converter provides line doubling to create added detail and consequently can serve as line doubling and enhancer. The signal output from line doubling and enhancer can be passed on to a multi-scan (high density television capable) monitor.

Null modem 512 swaps wires so that "send" goes to "receive" and "receive" goes to "send" to allow transparent full duplex communications. Any standard null modem can accomplish this. DCU/DTE units 510R, 510T are provided by the telephone company in the region in which patch unit 580 is located.

"Digital Film, Professional Video Editing Studio in a Box" User Manual, SuperMac Technology, Inc., 1992, is incorporated herein by reference. "Macintosh User's Guide, for desktop Macintosh computers," Apple Computer, Inc., 1992, is incorporated herein by reference. "Adobe Premiere, User Guide," Adobe Systems, Inc., 1992, is incorporated herein by reference. "ASI-IV," January 1992, IC556A and IC556AE is incorporated herein by reference. "RS-232 V.35 Interface Converter," IC221A-R2, by Black Box Corporation, August 1992, is incorporated herein by reference. "Model TCS-9700 Transportable Communications System, Operator's Manual" by Mobile Telesystems, Inc., Document 203890B, Dec. 24th, 1992, is incorporated herein by reference. Chapter 2 of "CM701 PSK Digital Modem Operator's Manual," by ComStream is incorporated herein by reference.

Figure 10A:
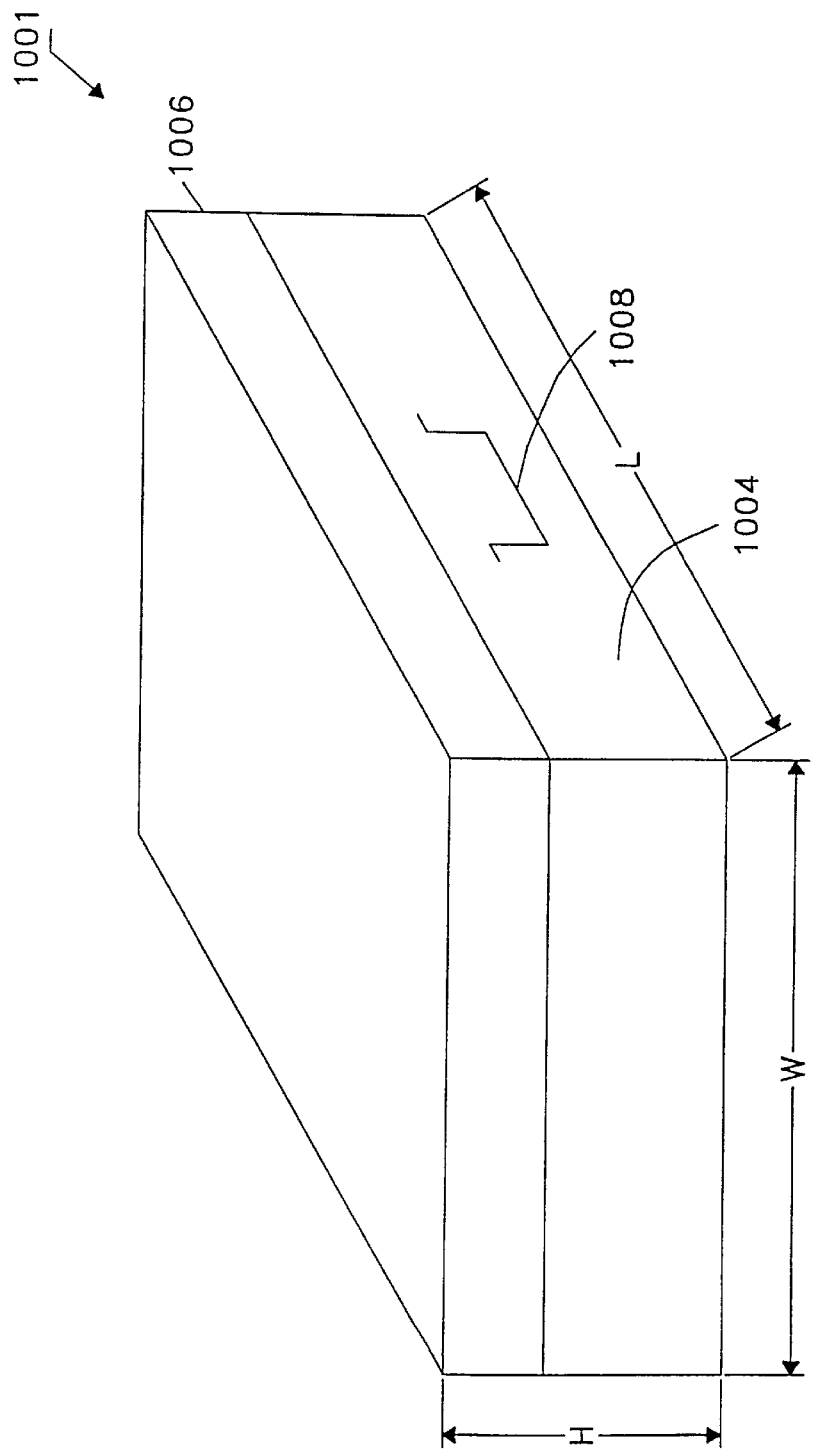
FIG. 10A shows a suitcase for housing any one of the embodiments described above and FIG. 10B shows the suitcase in FIG. 10A with an opened fabric microwave umbrella dish.

FIG. 10A shows a suitcase 1001 having a length L, width W and height H for housing any one of the embodiments described above and FIG. 10B shows suitcase 1001 with an opened fabric microwave umbrella dish 1002. In particular, FIG. 10A shows suitcase 1001 having a bottom portion 1004, a lid 1006 and a handle 1008. The length L, width W and height H of suitcase 1001 housing the above embodiments has been made smaller than 25 by 24.5 and 16 inches, respectively. Suitcase 1001 is light enough that a person of average strength can easily carry it by handle 1008. That is, all of the above embodiments can be housed in suitcase 1001 and consequently are portable.

Figure 10B:
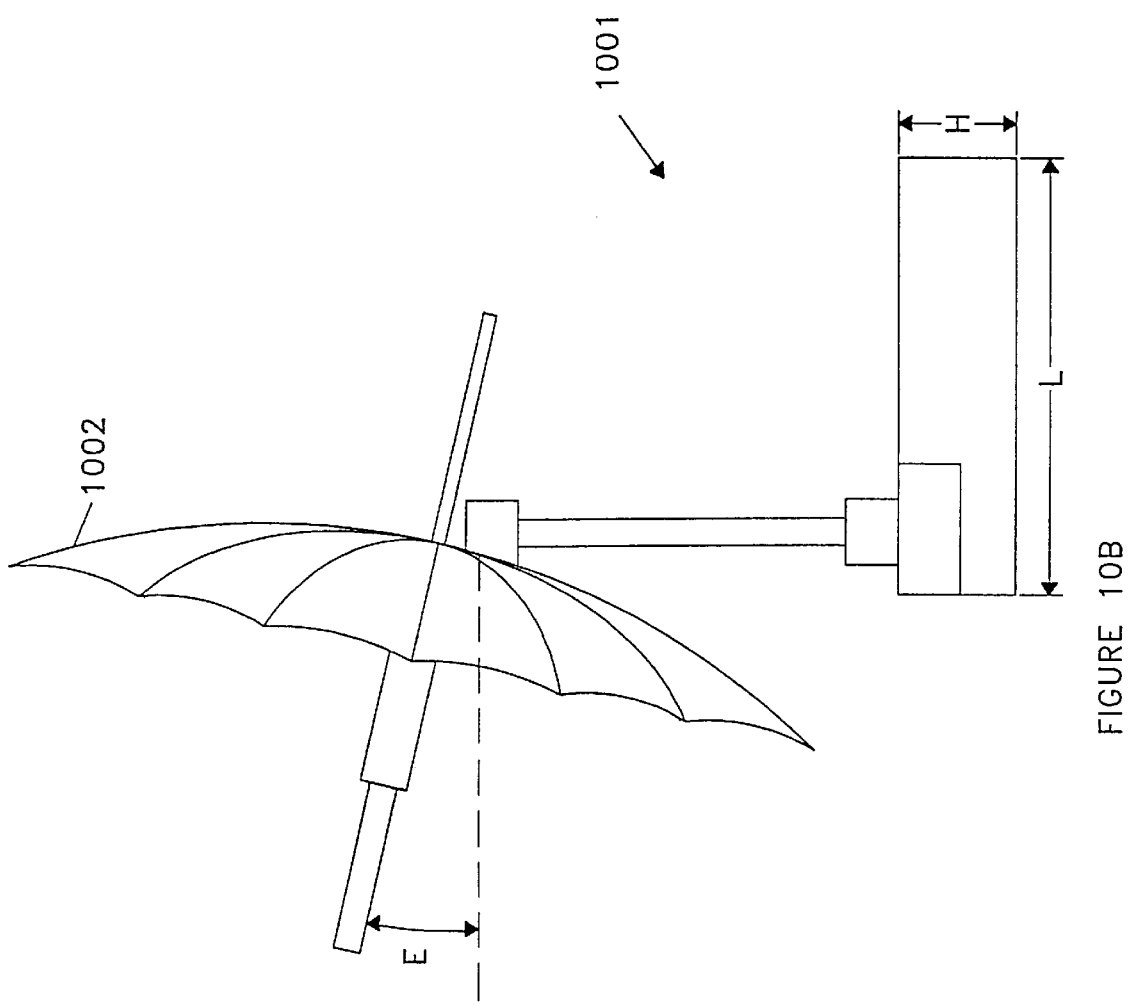

FIG. 10B shows suitcase 1001 with opened umbrella dish 1002. Microwave umbrella dish 1002 has a diameter of about 1.2 meters when opened. FIG. 10B shows umbrella dish 1008 to be slanted at an elevation angle E and ready to transmit and/or receive microwave signals.

Numerous and additional modifications and variations of the present invention are possible in light of the above teachings. It is therefore to be understood that within the scope of the appended claims, the invention may be practiced otherwise as specifically claimed.

What is claimed is:

1. A high speed teleconference station comprising:
   an encoding/compressing unit that encodes and compresses a first digital signal to produce a first compressed encoded signal;
   a multiplexing/demultiplexing unit coupled to said encoding/compressing unit that receives and splits said first compressed encoded signal into at least two split first compressed encoded signals;
   at least two converting units, coupled to said multiplexing/demultiplexing units, that receive a respective one of said at least two split first compressed encoded signals and respectively produce at least two first synchronous signals; and
   at least two output units, each coupled to a respective one of said at least two converting units, that receive a respective one of said at least two first synchronous signals, adapt and respectively output at least two adapted signals to a data link.

2. The high speed teleconference station of claim 1, wherein the at least two output units are microwave transmitter/receiver units, each generating a respective first microwave signal, modulating said respective first microwave signal according to said respective one of said at least two first synchronous signals to produce at least two first modulated microwave signals, further comprising
   a combining/splitting unit, coupled to said at least two microwave transmitter/receiver units, that combines said at least two first modulated microwave signals and outputs a first combined microwave signal to the data link.

3. The high speed teleconference station of claim 1, wherein the at least two output units are CCIT units that respectively output at least two high speed first synchronous signals to the data link.

4. The high speed teleconference station of claim 1, further comprising an interface unit that receives a first analog signal and outputs the first digital signal, wherein said first analog signal is audio and video for teleconferencing.

5. The high speed teleconference station of claim 1, further comprising a housing unit that houses said multiplexing/demultiplexing units, said at least two converting units, said at least two output units and said interface unit.

6. A high speed teleconference station comprising:
   an encoding/compressing unit that encodes and compresses a first digital signal to produce a first compressed encoded signal;
   a multiplexing/demultiplexing unit coupled to said encoding/compressing unit that receives and splits said first compressed encoded signal into at least two split first compressed encoded signals;
   at least two converting units, coupled to said multiplexing/demultiplexing units, that receive a respective one of said at least two split first compressed encoded signals and respectively produce at least two first synchronous signals;
   at least two microwave transmitter/receiver units, each coupled to a respective one of said at least two converting units, each receiving a respective one of said at least two first synchronous signals, generating a respective first microwave signal, modulating said respective first microwave signal according to said respective one of said at least two first synchronous signals to produce at least two first modulated microwave signals; and
   a combining/splitting unit, coupled to said at least two microwave transmitter/receiver units, that combines said at least two first modulated microwave signals and outputs a first combined microwave signal.

7. The high speed teleconference station of claim 6, further comprising a housing unit that houses said multiplexing/demultiplexing units, said at least two converting units, said at least two microwave transmitter/receiver units, and said combining/splitting unit.

8. The high speed teleconference station of claim 6, wherein said at least two converting units each include a protocol converter and an interface converter, wherein said interface converter is an RS-232 to V.35 interface converter, and wherein said encoding/compressing unit uses motion interpolation buffering.

9. The high speed teleconference station of claim 6, wherein:
   said combining/splitting unit receives a second combined microwave signal and outputs at least two second modulated microwave signals;
   said at least two microwave transmitter/receiver units each receive a respective one of said at least two second modulated microwave signals and outputs a respective one of at least two second synchronous signals;
   said at least two converting units each receive a respective one of said at least two second synchronous signals and respectively produces at least two split second compressed encoded signals; and
   said multiplexing/demultiplexing unit receives and combines said at least two split second compressed encoded signals into a second compressed encoded signal.

10. The high speed teleconference station of claim 9, further comprising:
    a decoding/decompressing unit coupled to said multiplexing/demultiplexing unit that receives said second compressed encoded signal and produces a second digital signal; and
    at least two modems, each coupled between a respective one of said at least two microwave transmitter/receiver units and a respective one of said at least two converting units.

11. A high speed teleconference station comprising:
    an encoding/compressing unit that encodes and compresses a first digital signal to produce a first compressed encoded signal;
    a multiplexing/demultiplexing unit coupled to said encoding/compressing unit that receives and splits said first compressed encoded signal into at least two split first compressed encoded signals;
    at least two converting units coupled to said multiplexing/demultiplexing unit that receive a respective one of said at least two split first compressed encoded signals and respectively produce at least two first synchronous signals; and
    at least two CCIT units, each coupled to a respective one of said at least two converting units, receives a respective one of said at least two first synchronous signals and respectively outputs at least two high speed first synchronous signals to a high speed data link.

12. The high speed teleconference station of claim 11, wherein:
    said at least two CCIT units each receives a respective one of at least two high speed second synchronous signals from the high speed data link and respectively produces at least two second synchronous signals;

said at least two converting units each receives a respective one of said at least two second synchronous signals and respectively produces at least two split second compressed encoded signals; and said multiplexing/demultiplexing unit receives and combines said at least two split second compressed encoded signals into a second compressed encoded signal.

13. The high speed teleconference station of claim 11, further comprising:

an interface unit that receives a first analog signal and outputs the first digital signal;

a decoding/decompressing unit, coupled to said multiplexing/demultiplexing unit, that receives said second compressed encoded signal and produces a second digital signal; and a housing unit that houses said interface unit, said encoding/compressing unit, said multiplexing/demultiplexing unit, said at least two converting units, said at least two CCIT units, and said decoding/decompressing unit.

14. A method for transmitting teleconferencing information comprising the steps of:

encoding and compressing a first digital signal to produce a first compressed encoded signal using an encoder/compressor;

splitting said first compressed encoded signal into at least two split first compressed encoded signals using a demultiplexer;

converting each of said at least two split first compressed encoded signals into respective at least two first synchronous signals using respective at least two converters; and modifying and transmitting said at least two first synchronous signals.

15. The method for transmitting teleconferencing information of claim 14, wherein said step of modifying and transmitting comprises:

producing respective at least two first high speed synchronous signals for said at least two first synchronous signals using respective at least two CCIT devices; and transmitting said at least two high speed first synchronous signals to a high speed data link.

16. The method for transmitting teleconferencing information of claim 14, wherein said step of modifying and transmitting comprises:

generating a respective microwave signal using a respective one of at least two microwave transmitter/receiver units;

modulating said respective microwave signal according to said respective ones of said at least two first synchronous signals to produce at least two first modulated microwave signals using said at least two microwave transmitter/receiver units; and combining said at least two first modulated microwave signals using a combining/splitting unit to produce a combined first microwave signal and outputting the combined first microwave signal.

17. The method of claim 14, further comprising the steps of:

receiving at least two second synchronous signals;

converting said at least two second synchronous signals to respective at least two split second compressed encoded signals;

combining said at least two split second compressed encoded signals into a second compressed encoded signal using a multiplexer; and decoding and decompressing said second compressed encoded signal to produce a second digital signal.

18. The method of receiving teleconferencing information of claim 17, wherein said receiving at least two second synchronous signals comprises:

receiving two high speed second synchronous signals from a high speed data link; and producing said respective two second synchronous signals from said two high speed second synchronous signals.

19. The method for receiving teleconferencing information of claim 17, wherein said receiving at least two second synchronous signals comprises:

receiving a combined second microwave signal;

splitting said combined second microwave signal using a combining/splitting unit to produce two second modulated microwave signals; and receiving said two second modulated microwave signals using at least two microwave transmitter/receiver units and outputting said two second synchronous signals.

* * * * *